United States Patent
Magee et al.

(10) Patent No.: US 10,857,633 B2
(45) Date of Patent: Dec. 8, 2020

(54) TOOLHOLDER WITH PROVISIONS FOR BIT REMOVAL

(71) Applicant: Caterpillar Paving Products Inc., Brooklyn Park, MN (US)

(72) Inventors: Kevin J. Magee, Buffalo, MN (US); Mario Persano, Poggio Renatico (IT); Dario Sansone, Castello D'Argile (IT); Marco Cesari, Budrio (IT); Prasad S. Virgi, Perungudi (IN); Danilo Ciardullo, Dipignano (IT)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 22 days.

(21) Appl. No.: 16/125,509

(22) Filed: Sep. 7, 2018

(65) Prior Publication Data

US 2020/0078886 A1    Mar. 12, 2020

(51) Int. Cl.
*B23P 19/02*      (2006.01)
*E21C 35/18*      (2006.01)
*B23P 19/027*    (2006.01)

(52) U.S. Cl.
CPC ........... *B23P 19/025* (2013.01); *B23P 19/027* (2013.01); *E21C 35/18* (2013.01)

(58) Field of Classification Search
CPC .. E21C 35/18; E21C 35/1803; E21C 35/1806; E21C 35/1816; E21C 35/1826; E21C 35/19; B23P 19/025; B23P 19/027
USPC ........................................ 29/244, 252, 426.5
See application file for complete search history.

(56) References Cited

U.S. PATENT DOCUMENTS

| | | | |
|---|---|---|---|
| 6,244,665 B1* | 6/2001 | Bise | E21C 35/18 299/106 |
| 6,371,567 B1* | 4/2002 | Sollami | B28D 1/188 299/104 |
| 7,401,862 B2 | 7/2008 | Holl et al. | |
| 7,950,745 B2 | 5/2011 | Sollami | |
| 8,181,322 B2 | 5/2012 | Lehnert et al. | |
| 8,286,316 B2 | 10/2012 | Lehnert et al. | |
| 8,622,483 B2* | 1/2014 | Sollami | B25B 23/0035 299/102 |
| D715,342 S | 10/2014 | Fundakowski et al. | |
| 8,950,821 B2 | 2/2015 | Fundakowski et al. | |
| 9,157,320 B2 | 10/2015 | Lehnert et al. | |
| 2013/0000090 A1 | 1/2013 | Lehnert et al. | |
| 2015/0028656 A1* | 1/2015 | Sollami | E21C 35/18 299/79.1 |
| 2018/0297236 A1* | 10/2018 | Magee | E21C 35/197 |

FOREIGN PATENT DOCUMENTS

EP          2789794          10/2014

* cited by examiner

*Primary Examiner* — Christopher M Koehler
(74) *Attorney, Agent, or Firm* — Schwegman, Lundberg & Woessner

(57) ABSTRACT

A bit holder can include a body and a collar. The body can be mountable to a rotor of a piece of equipment. The collar can be coupled to the body and can be configured to receive the bit therein. The collar can include a first flat collar surface forming a portion of a radially outer surface of the collar and a second flat collar surface forming a portion of the radially outer surface of the collar.

18 Claims, 18 Drawing Sheets

TOOLHOLDER WITH PROVISIONS FOR BIT REMOVAL

TECHNICAL FIELD

This disclosure relates generally, but not by way of imitation, to constructing, repairing, reconditioning, or taking-up road or like surfaces. More particularly, this disclosure relates to apparatus, systems, and methods for removing bits from rotors.

BACKGROUND

Paving machines such as cold planer and rotary mixer machines include a rotor that cuts or mixes the ground or asphalt. The rotor includes bits mounted to a bit holder at the outer surface of the rotor, so that the bits engage with the ground when the rotor is pushed down by the machine. This cutting action wears rapidly on the bits, such that they require frequent replacement, in some examples as frequently as every few hours. Replacing the bits requires a technician to work in a constrained area within the rotor housing.

SUMMARY OF THE INVENTION

To summarize at least a portion of the disclosure, a non-limiting list of examples is provided here:

Example 1 is a bit holder comprising: a body mountable to a rotor of a piece of equipment, the body defining a body bore configured to receive a bit therein; and a collar coupled to the body, the collar defining a collar bore substantially coaxial with the body bore and configured to receive the bit therein, the collar comprising: a first flat collar surface forming a portion of a radially outer surface of the collar; and a second flat collar surface forming a portion of the radially outer surface of the collar on an opposite side of the collar from the first flat collar surface.

In Example 2, the subject matter of Example 1 optionally includes wherein the collar has a geometric shape substantially of a hollow cylinder with two flat portions on the radially outer surface of the hollow cylinder.

In Example 3, the subject matter of any one or more of Examples 1-2 optionally include wherein the first flat collar surface is angled with respect to a first tangent of the collar.

In Example 4, the subject matter of Example 3 optionally includes wherein the first flat collar surface is angled at an angle between 0.1 degrees and 10 degrees.

In Example 5, the subject matter of any one or more of Examples 3-4 optionally include wherein the second flat collar surface is not parallel to the first collar surface.

In Example 6, the subject matter of any one or of Examples 1-5 optionally include wherein the first flat collar surface and the second flat collar surface extend along an entirety of a length of the collar.

In Example 7, the subject matter of any one or more of Examples 1-6 optionally include wherein the body includes a first body flat adjacent to the first collar flat, the first body flat coplanar with the first collar flat, and wherein the body includes a second body flat adjacent to the second collar flat, the second body flat coplanar with the second collar flat.

In Example 8, the subject matter of Example 7 optionally includes wherein the collar is coupled to a back side of the body, and wherein the first body flat extends from the back side of the body proximally into the body.

In Example 9, the subject matter of any one or more of Examples 1-8 optionally includes wherein the first flat collar surface extends radially inward from an outer radius of the collar between 0.1 and 4.0 millimeters Example 10 is a bit removal system comprising: a bit holder comprising: a body mountable to a rotor of a piece of equipment, the body configured to receive a bit therein; a collar coupled to the body, the collar configured to receive a bit therein, the collar comprising: a first notch forming a first planar surface located on a periphery of the collar; and a second notch forming a second planar located on the periphery of the collar on an opposite side of the collar from the first notch, the first and second notch configured to receive a portion of an extractor thereon; and a bit removal device insertable onto the collar over the first notch and the second notch, the bit removal device supportable by the body and operable to engage the bit to remove the bit from the bit holder.

In Example 11, the subject matter of Example 10 optionally includes wherein the bit removal device includes an extractor insertable onto the first and second notches of the collar to engage the bit from a distal side of the bit holder to extract the bit from the bit holder.

In Example 12, the subject matter of any one or more of Examples 10-11 optionally includes wherein the bit removal device includes a support coupled to the extractor and configured to engage the bit holder to support the extractor as it extracts the bit from the bit holder.

In Example 13, the subject matter of any one or more of Examples 10-12 optionally includes wherein the bit removal device includes an actuator configured to move the extractor relative to the support to extract the bit from the bit holder.

In Example 14, the subject matter of any one or more of Examples 10-13 optionally includes wherein the collar has a geometric shape substantially of a hollow cylinder with two flat portions on a radially outer surface of the hollow cylinder.

In Example 15, the subject matter of any one or more of Examples 10-14 optionally includes wherein the first notch is angled with respect to a first tangent of the collar, and wherein the second notch is angled with respect to a second tangent of the collar that is parallel to the first tangent.

In Example 16, the subject matter of any one or more of Examples 10-15 optionally includes optionally includes wherein the first notch is angled at an angle between 2 degrees and 6 degrees.

In Example 17, the subject matter of any one or more of Examples 10-16 optionally includes optionally includes wherein the first notch and the second notch extend along an entirety of a length of the collar.

In Example 18, the subject matter of any one or more of Examples 10-17 optionally includes wherein the collar is coupled to a back side of the body, wherein the body includes a first body flat adjacent to the first notch, the first body flat coplanar with the first notch, and wherein the body includes a second body flat adjacent to the second notch, the second body flat coplanar with the second notch, and wherein the first body flat and the second body flat extend from the back side of the body proximally into the body.

Example 19 is a method of removing a bit from a bit holder, the method comprising: providing a support of a bit removal device configured to engage a body of a bit holder; providing an extractor of the bit removal device configured to engage a first flat and a second flat of a collar of the bit holder; and coupling the support to the extractor with an actuator configured to move the extractor relative to the support to extract the bit from the bit holder.

In Example 20, the subject matter of Example 19 optionally includes providing the bit holder including a first body flat coplanar with the first flat of the collar and a second body flat coplanar with the second flat of the collar.

Example 21 is a bit holder comprising: a body mountable to a rotor of a piece of equipment, the body defining a body bore configured to receive a bit therein; and a collar coupled to the body, the collar defining a collar bore substantially coaxial with the body bore and configured to receive the bit therein, the collar comprising: a first flat collar surface forming a portion of a radially outer surface of the collar; and a second flat collar surface forming a portion of the radially outer surface of the collar on an opposite side of the collar from the first flat collar surface, the first flat collar surface and the second flat surface configured to receive a portion of an extractor thereon.

In Example 22, the systems, devices, or methods of any one or any combination of Examples 1-21 can optionally be configured such that all elements or options recited are available to use or select from.

These and other examples and features of the present devices, systems, and methods will be set forth in part in the following Detailed Description. This overview is intended to provide a summary of subject matter of the present patent application. It is not intended to provide an exclusive or exhaustive removal of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A bit removal device may include a support, an extractor, and an actuator configured such that the bit removal device approaches a bit from the front side of its bit holder and is able to extract the bit from the front side of the bit holder. Further, in some examples, the actuator may be a hydraulic actuator, a pneumatic actuator, or an electric actuator. The bit removal device may work universally rather than requiring a specific bit or bit holder. Further, the bit removal device may be quieter than, for example, a pneumatic hammer bit removal device. Finally, the bit removal device may allow for better visibility and serviceability of rotary bits.

Figure 1:
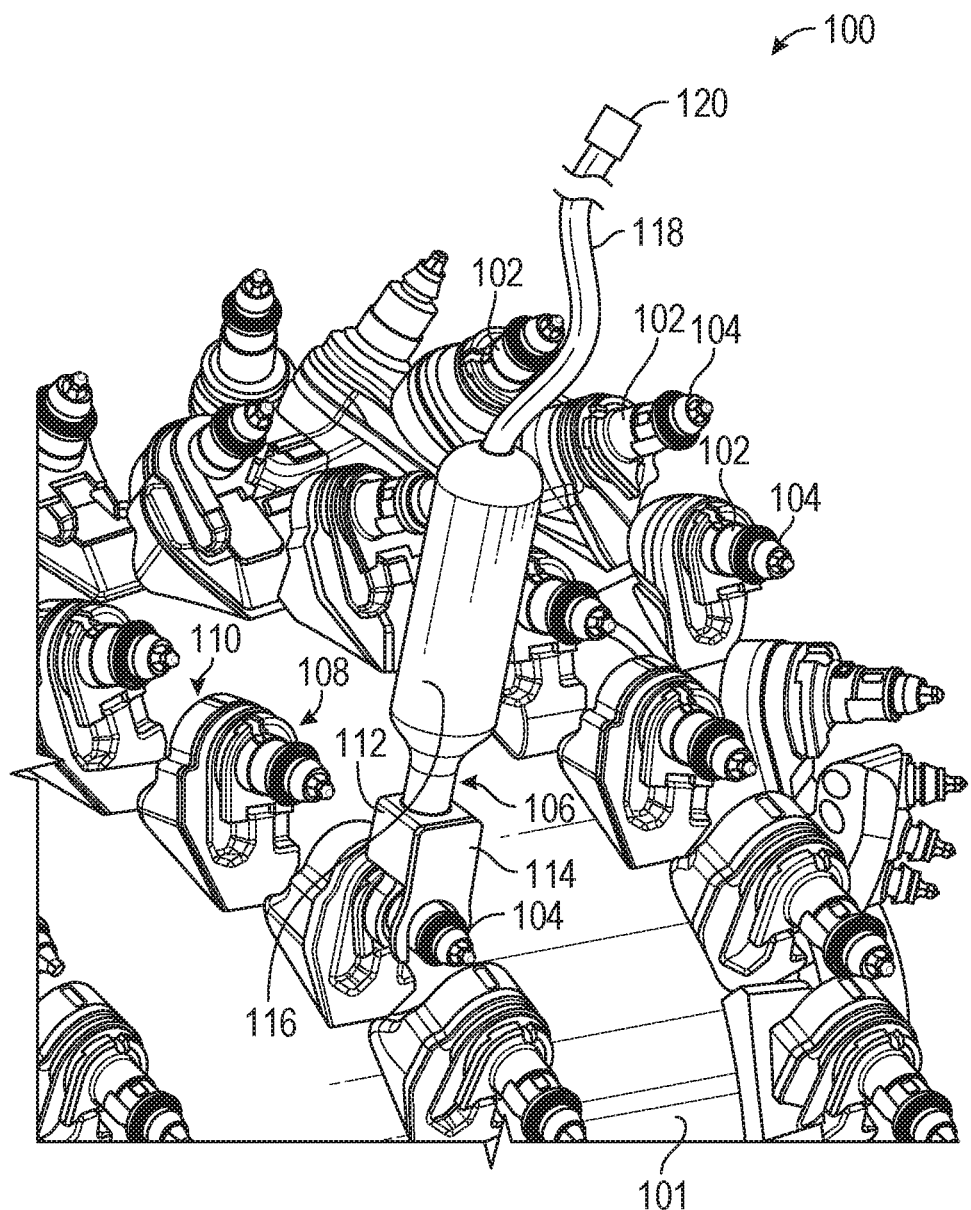
FIG. 1 is a perspective view of a bit removal device and a portion of a rotor, in accordance with at least one example of the present disclosure.

FIG. 1 is a perspective view of an exemplary bit removal system 100 and a portion of a rotor 101. For example, the rotor 101 may be part of a cold planer, a rotary mixer, a paving machine, or another rotary machine. The rotor 101 includes a plurality of bit holders 102, each of which holds a bit 104. The bit removal system 100 includes a bit removal device 106, which is configured such that it can be used to approach the bit 104 from a front side 108 of the bit holder 102 and remove the bit 104 from the front side 108 of the bit holder 102 (rather than requiring a portion of the bit removal device 106 to engage or otherwise approach the back side 110 of the bit holder 102 to remove the bit 104). As such, the bit removal device 106 does not require that the bit holder 102 have any special features for the bit removal device 106 to remove the bit 104 from the bit holder 102. However, in some examples, the bit removal device 106 can interface with special features of the hit holder 106, as discussed in further detail with reference to FIGS. 14-20.

The bit removal device 106 includes a support 112, an extractor 114, and an actuator 116. The extractor 114 is movably coupled to the support 112, such that the actuator 116 moves the extractor 114 relative to the support 112 to extract the bit 104 from the bit holder 102. In the illustrated example, the bit removal system 100 further includes a connector 118 connected to the bit removal device. The connector 118 may include, for example, a cord, tube, plug, socket, coupling, another connective device, a combination of these, or the like. In at least one example, the connector 118 may facilitate coupling the bit removal device 106 to a power source 120, for example a hydraulic power source, a pneumatic power source or an electric power source. In at least one example, the power source 120 is not a pneumatic hammer. In at least one example, the connector 118 may couple the bit removal device 106 to the power source 120 of the rotary machine. For example, in the case of a cold planer or a rotary mixer, the connector 118 couples the bit removal device 106 to the hydraulic system 120 of the cold planer or rotary mixer, such that the hydraulic system 120 of the cold planer or rotary mixer provides the power for the actuator 116 to move the extractor 114 relative to the support 112 to extract the bit 104. In at least one example, the actuator 116 of the bit removal device 106 includes a power source, for example a hydraulic power source, a pneumatic power source, or an electric power source. In some examples, the actuator 116 may be oriented differently than illustrated. In at least one example, the actuator 116 is oriented perpendicular to a longitudinal axis of the illustrated actuator 116. In some examples, the actuator 116 may extend from a front side of the extractor 114.

Figure 2:
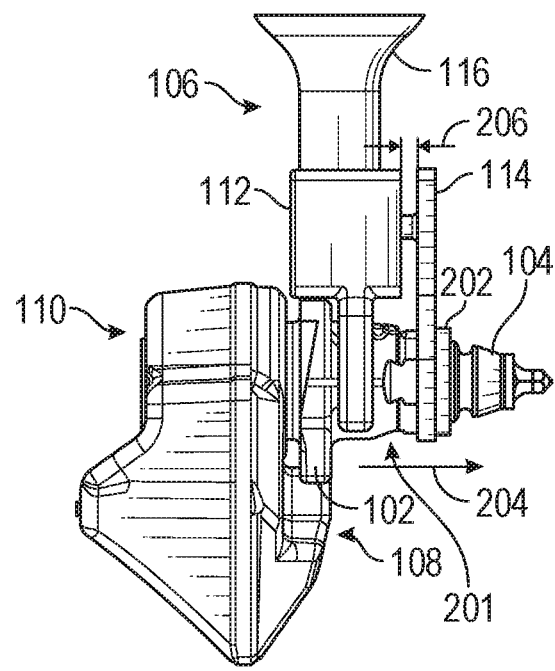
FIG. 2 is a side view of the bit removal device of FIG. 1 engaging a bit, in accordance with at least one example of the present disclosure.
Figure 3:
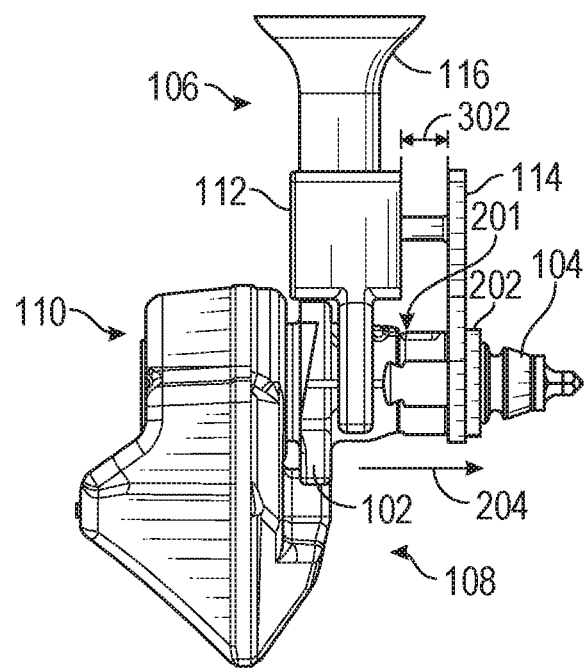
FIG. 3 is a side view of the bit removal device and bit of FIGS. 1 and 2 after the bit removal device has moved the bit, in accordance with at least one example of the present disclosure.
Figure 4:
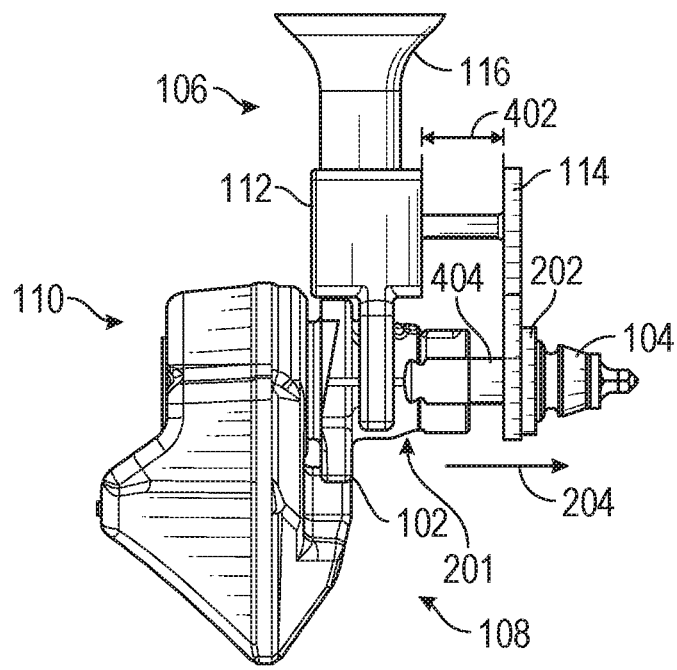
FIG. 4 is a side view of the bit removal device and bit of FIGS. 1-3 after the bit removal device has moved the bit, in accordance with at least one example of the present disclosure.

FIGS. 2-4 are side views of the bit removal device 106 of FIG. 1 engaging a bit 104. As shown in FIG. 2, the bit removal device 106 has engaged the bit holder 102 and the bit 104. The support 112 extends over or around a neck portion 201 of the bit holder 102. The support 112 engages the bit holder 102 to support the extractor 114 as it extracts the bit 104 from the bit holder 102. In the illustrated example, the support 112 is an arcuate bracket that extends partially around a circumference of the neck portion 201 from a top side of the bit holder 102, however, in other examples the support 112 may have a different shape, may extend over more or less of the neck portion 201 and from a side or the bottom of the bit holder 102. In the illustrated example, the extractor 114 is an arcuate bracket that extends over the bit holder 102 behind a collar or washer 202 of the bit 104. In some examples, the extractor 114 may engage in front of the collar or washer 202, for example, in a groove such as a puller groove. In other examples, the extractor 114 may have a different shape, may extend over more or less of the bit holder 102 and from a side of the bottom of the bit older 102, as long as it still engages the collar or washer 202 of the bit 104. Once in position, the actuator 116 moves the extractor 114 in a movement direction 204, such that the support 112 remains stationary on the bit holder 102, as the extractor 114 moves relative to the support 112 to apply a force in the movement direction 204 to the back of the collar or washer 202 to move the bit 104 away from the bit holder 102. That is, the actuator 116 moves the extractor 114 relative to the support 112 such that the support 112 remains engaged with the bit holder 102 while the extractor 114 removes the bit 104 from the bit holder 102. In at least one example, the actuator 116 moves the extractor 114 axially (along a longitudinal axis of the bit 104) relative to the support 112. In at least one example, the extractor 114 moves relative to the support 112 to apply a force in the movement direction 204 to the bit via the extractor's 114 engagement with the groove (e.g. a puller groove, or a groove in front of the washer or collar 202). In at least one example, the movement direction 204 is an axial linear direction. In the illustrated example of FIG. 2, the extractor 114 is positioned a first distance 206 away from the support 112.

As illustrated in FIG. 3, the actuator 116 has moved the extractor 114 relative to the support 112 in the movement direction 204 a second distance 302, which is greater than the first distance, and the bit 104 has been moved in the movement direction 204 relative to the bit holder 102. In FIG. 4, the bit removal device 106 continues to remove or extract the bit 104 from the bit holder 102. As illustrated, the actuator 116 has moved the extractor 114 relative to the support 112 in the movement direction 204 a third distance 402, which is greater than the second distance. Due to its engagement with the collar or washer 202 of the bit 104, the extractor 114 has moved the bit 104 in the movement direction 204 relative to the bit holder 102, such that a portion of a stem 404 of the bit 104 is now visibly removed from within the bit holder 102. Once the actuator 116 has moved the extractor 114 in the movement direction 204 such that the stem 404 is fully removed from the bit holder 102, the bit 104 has been extracted from the bit holder 102, and the support 112 can disengage from the bit holder 102. In such a case, a technician might move the bit removal device 106 to a subsequent bit 102 in need of servicing to remove the subsequent bit 104 from its bit holder 102. It should be noted that the bit removal device 106 removed the bit 104 without approaching or engaging the bit 104 from a back side 110 of the bit holder 102. As such, the bit removal device 106 can remove any bit 104 from any bit holder 102, so long as the extractor 114 can engage a collar or washer 202 of the bit 104.

Figure 5:
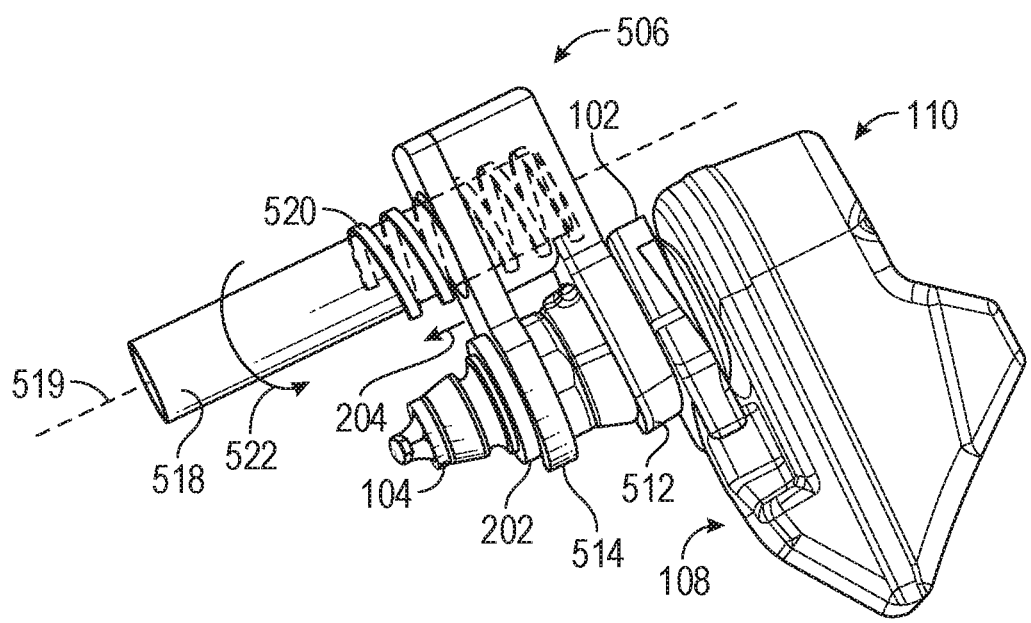
FIG. 5 is a perspective view of a bit removal device engaging a bit, in accordance with at least one example of the present disclosure.

FIG. 5 is a perspective view of an exemplary bit removal device 506 engaging a bit 104. The bit removal device 506 includes a support 512 and an extractor 514, similar to the support 112 and the extractor 114 described above with reference to FIGS. 1-4. The bit removal device 506 further includes a leadscrew 518 defining a longitudinal axis 519 and including threads 520 which correspond to internal threads of the support 512. An actuator 116 (see FIGS. 1-4) rotates the leadscrew 518 in a rotational direction 522 about the longitudinal axis 519 to move the leadscrew 518 and therefore the extractor 514 in the movement direction 204 along the longitudinal axis 519 (an axial direction) to remove the bit 104 from the bit holder 102. In at least one example, the longitudinal axis 519 is parallel to a longitudinal axis of the bit 104. In some examples, the actuator 116 includes a driver to rotate the leadscrew 518. In at least one example, the actuator 116 includes an electric power source as described elsewhere in this disclosure. In some examples, the bit removal device 506 includes a connector 118 (see FIG. 1) that connects the bit removal device 506 to a power source 122 (see FIG. 1), for example an electric power source.

In some examples, the bit removal device 506 may include one or more hydraulic cylinders to provide the force to move the extractor 514 relative to the support 512. In at least one example, the bit removal device 506 does not include the leadscrew 518.

Figure 6:
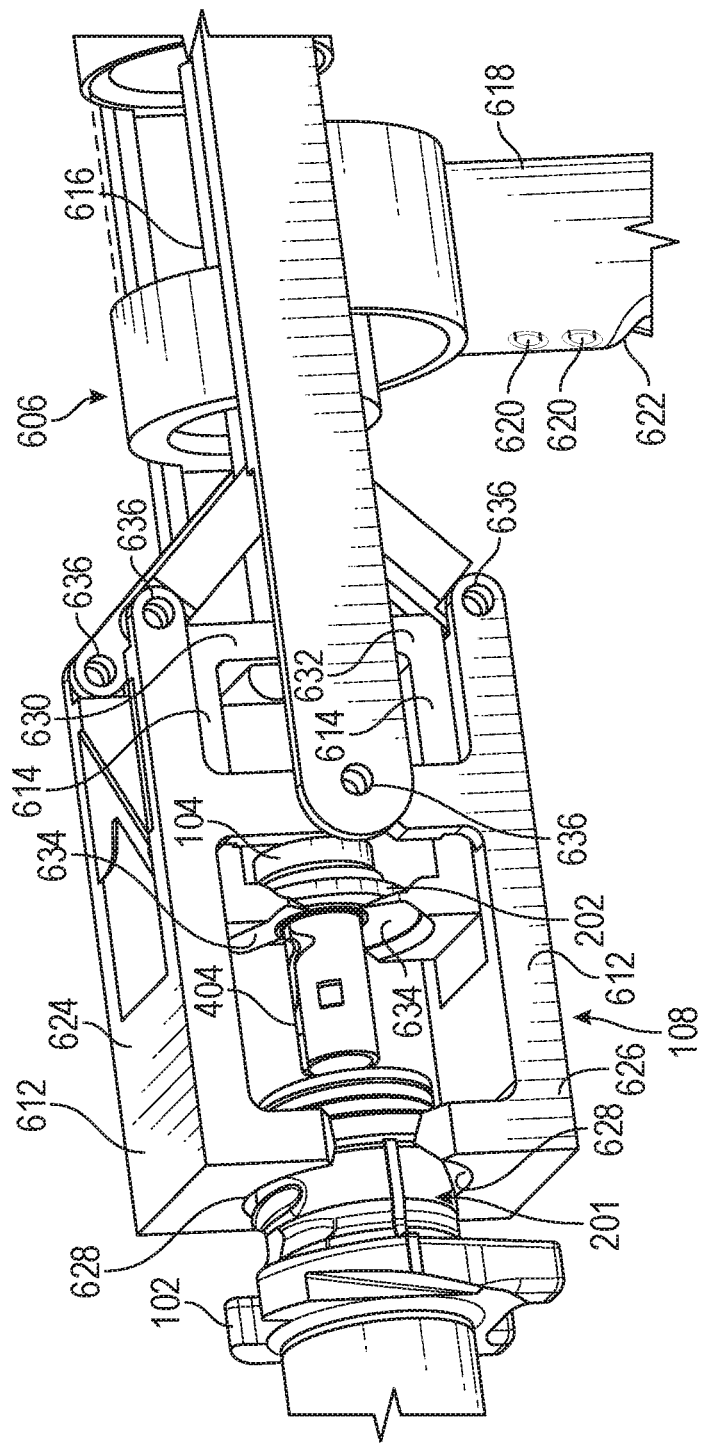
FIG. 6 is a perspective view of an exemplary bit removal device removing a bit.

FIG. 6 is a perspective view of an exemplary bit removal device 606 removing a bit 104 from a bit holder 102. The bit removal device 606 includes a support 612, and extractor 614, an actuator 616, a handle 618, and a user interface 620. In various examples, the user interface 620 may include one or more triggers or buttons. In at least one example, the user interface 620 may include a display or a touch screen. A user (e.g., a technician) may interact with the user interface 620 to control movement of one or more aspects of the bit removal device 606. For example, the actuator 616 receives a signal from the user interface 620 to control movement of the extractor 614 (e.g., to start, stop, or change direction of, movement of the extractor 614 relative to the support). In the illustrated example, at least a portion of the user interface 620 is positioned on the handle 618. In other examples, the user interface 620 may be positioned elsewhere on the bit removal device 606. In at least one example, the user interface 620 may be a separate or external device in communication with the bit removal device 606. In the illustrated example, the handle 618 includes a grip 622, however, in other examples the handle 618 may be arranged differently or include different features to accommodate various positions. In at least one example, an external surface of the actuator 616 serves as a handle 618 for the technician. While the illustrated example shows the actuator 616 as a hydraulic actuator including a hydraulic cylinder and piston, in other examples the actuator 616 may be an electric actuator, or the power source (electric or hydraulic) may be external and connected to the actuator 616 via a connector 118 as described with reference to FIG. 1.

In the illustrated example, the support 612 includes first and second support arms 624, 626 extending from opposite sides of the circumference of the neck portion 201 of the bit holder 102. Each support arm 624, 626 includes an arcuate bracket 628, such that it can fit around the circumference of the neck portion 201. In other examples, each support arm 624, 626 may include any of a variety of surfaces to engage the bit holder 102, for example, one or more fingers, a non-arcuate bracket, a surface that corresponds to the shape of a portion of the bit holder 102, a combination of these, or the like. The extractor 614 is illustrated as having first and second extractor arms 630, 632 extending on opposite sides of the bit 104. Each of the first and second extractor arms 630, 632 includes an arcuate bracket 634 to engage a portion of the bit 104 behind the collar or washer 202. In at least one example, the arcuate bracket 628 of each support arm 624, 626 has a different radius of curvature than the arcuate bracket 634 of each extractor arm 630, 632. In at least one example, the different radii of curvature correspond to the differences in circumference of the neck portion 201 of the bit holder 102 and the relevant portion of the bit 104. In the illustrated example, each of the support 612 and the extractor 614 includes one or more hinge points 636, the purpose of which is further illustrated with respect to FIGS. 7 and 8.

Figure 7:
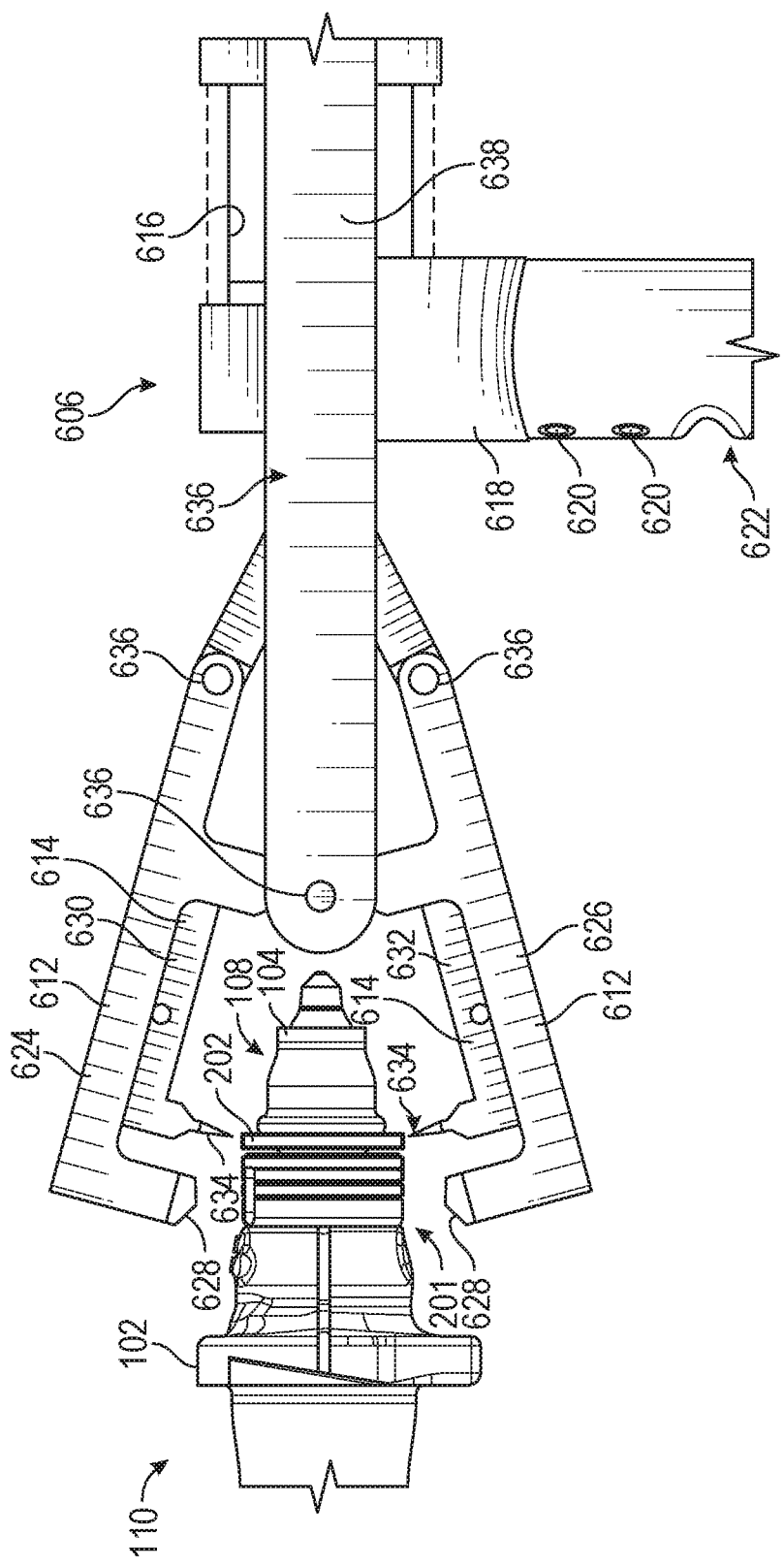
FIG. 7 is a side view of the bit removal device and bit of FIG. 6 before the bit removal device has engaged the bit, in accordance with at least one example of the present disclosure.

FIG. 7 is a side view of the bit removal device 606 and bit 104 of FIG. 6 before the bit removal device 606 has engaged the bit 104. Each of the support 612 and the extractor 614 are in an open position, such that they can be positioned over the selected bit 104 before clamping down on the bit holder 102 and bit 104. In the open position, the first support arm 624 is moved away from the second support arm 626 by pivoting at one or more of its hinge points 636. Similarly, the first extractor arm 630 is moved away from the second extractor arm 632 in the open position by pivoting at one or more hinge points 636. In at least one example, there is overlap in the hinge points 636 of the support 612 and the extractor 614.

Figure 8:
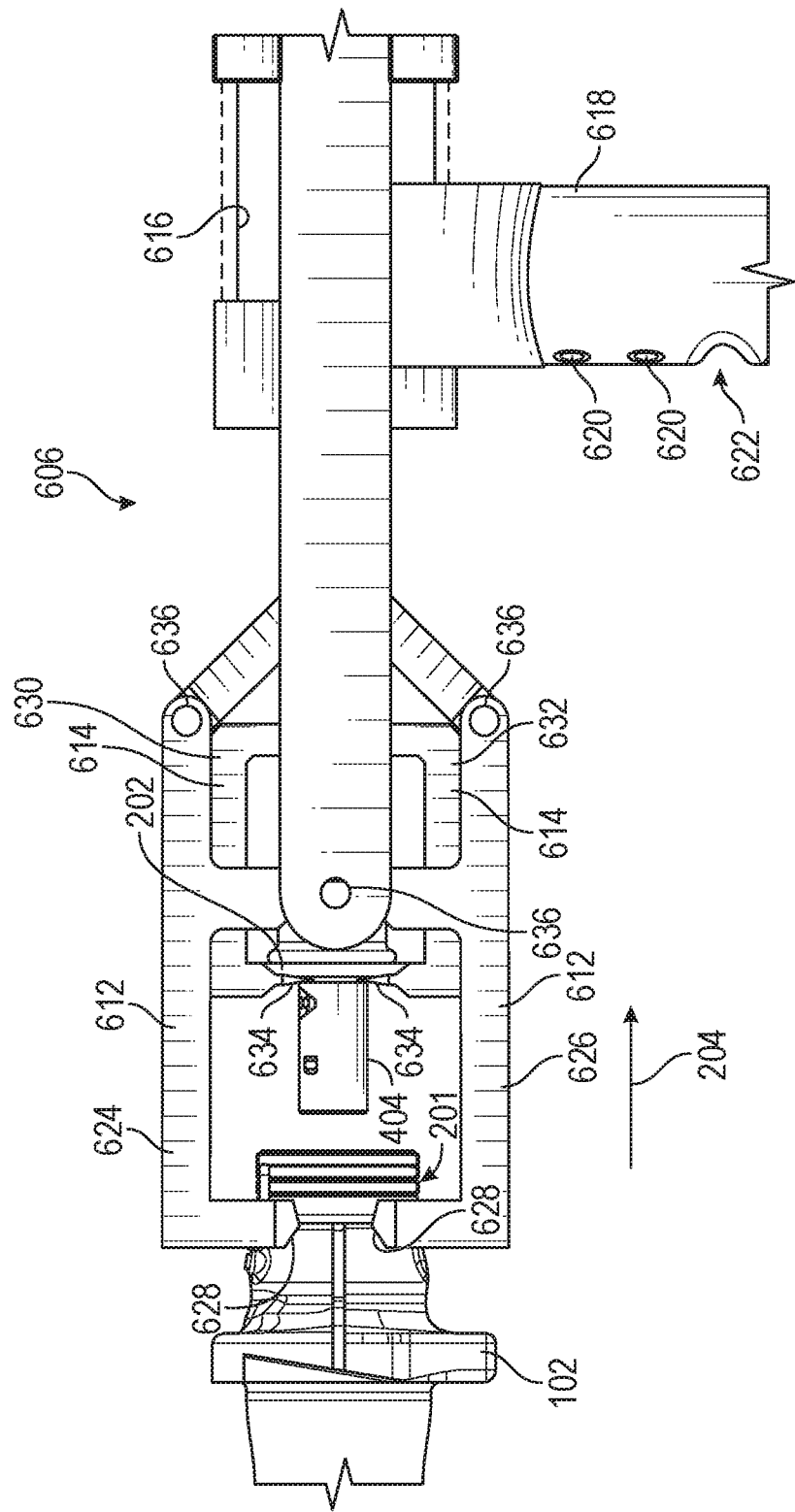
FIG. 8 is a side view of the bit removal device and bit of FIGS. 6 and 7 after the bit removal device has removed the bit, in accordance with at least one example of the present disclosure.

FIG. 8 is a side view of the bit removal device 606 and bit 104 of FIGS. 6 and 7 after the bit removal device 606 has removed the bit 104. Each of the support 612 and the extractor 614 are in a closed position, and the extractor 614 has moved in the movement direction 204 relative to the support 612 applying a force to the back of the collar or washer 202 of the bit 104 to remove the bit 104 from the bit holder 102. In the closed position, one or more hinge points 636 have adjusted to allow the arcuate brackets 628 of the support 612 to engage the neck portion 201 of the bit holder 102. Further, one or more hinge points 636 have adjusted to allow the arcuate brackets 634 of the extractor 614 to engage the bit 104 behind the collar or washer 202.

In at least one example, the actuator 616 controls the opening and closing of the support 612 and the extractor 614. In some examples, the user interface 620 allows a user to send a signal to the actuator 616 to initiate opening or closing of the bit removal device 606. In at least one example, the closing action is combined with the removal action, such that when the actuator 616 receives a signal from the user interface 620 to close the bit removal device 606, the actuator 616 closes the bit removal device 606 to engage the bit holder 102 and bit 104 and subsequently moves the extractor 614 relative to the support 612 to remove the bit 104 from the bit holder 102. In some examples, opening and closing the device involves a second actuator 638. The second actuator 638 may be a mechanical, electric, or hydraulic actuator. In at least one example, the user interface 620 may initiate action by the second actuator 638. In at least one example, a button or a trigger is used to initiate the second actuator 638. In some examples, the bit removal device is biased in the closed position.

Figure 9:
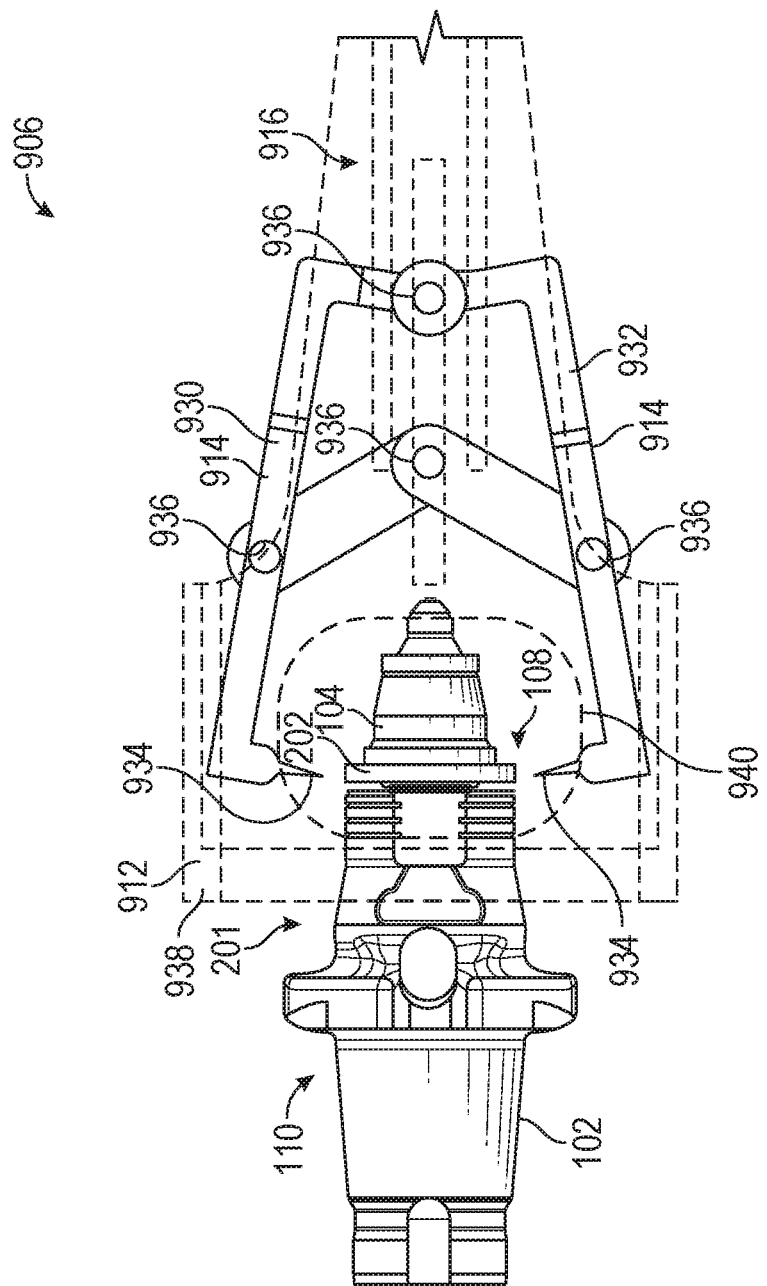
FIG. 9 is a side view of a hit removal device and a hit before the hit removal device has engaged the bit, in accordance with at least one example of the present disclosure.

FIG. 9 is a side view of an exemplary bit removal device 906 and a bit 104 before the bit removal device 906 has engaged the bit 104. The bit removal device 906 includes a support 912, an extractor 914, and an actuator 916. The extractor 914 includes a first extractor arm 930 and a second extractor arm 932. In at least one example, each extractor arm 930, 932 includes an arcuate bracket 934 for engaging the bit 104 behind a collar or washer 202 of the bit 104. The extractor 914 includes one or more hinge points 936, such that the first and second extractor arms 930, 932 may separate into the open position shown in FIG. 9 to be positioned over the bit 104. While four hinge points 936 are shown in the illustrated example, other examples may include more or less hinge points 936 to control the opening and closing of the extractor 914. The support 912 includes a sleeve 938 that houses at least a portion of the extractor 916. In some examples, at least a portion of the sleeve 938 may be cylindrical or semicylindrical. In some examples, the sleeve 938 may include an arcuate bracket. The sleeve 938 engages the neck portion 201 of the bit holder 102 to support the extractor 914 as the extractor 914 removes the bit 104 from the bit holder 102. In at least one example, the sleeve 938 is configured to slide over the bit 104 from a front side 108 of the bit holder 102. In some examples, the sleeve 938 may define a window 940 that can facilitate a user's visibility when lining up and engaging the extractor 914 with the bit 104.

Figure 10:
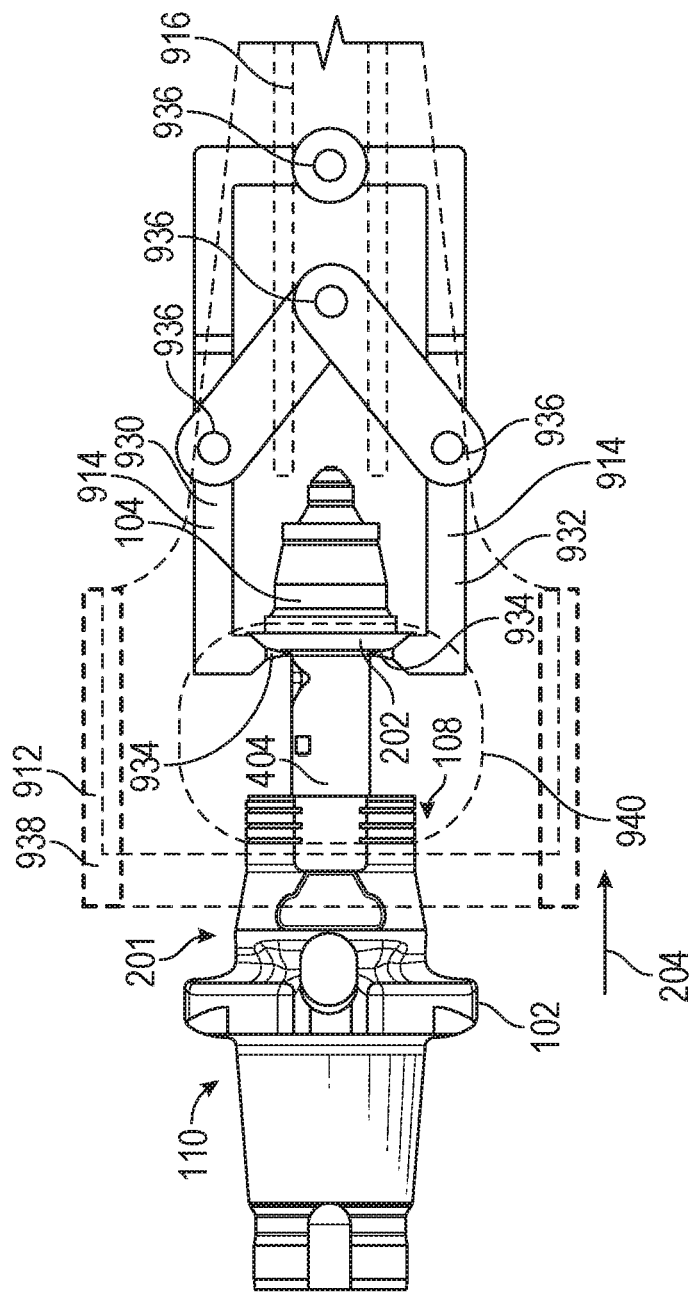
FIG. 10 is a side view of the hit removal device and hit of FIG. 9 as the bit removal device is removing the bit.

FIG. 10 is a side view of the bit removal device 906 and bit 104 of FIG. 9 as the bit removal device 906 is removing the bit 104. The extractor 914 is shown in the closed position with the arcuate bracket 934 of each extractor arm 930, 932 engaging the bit 104 behind the collar or washer 202. The support 912 has remained engaged with the bit holder 102 and supported the extractor 914 as the actuator 916 has moved the extractor 914 in the movement direction 204 to remove the bit 104 from the bit holder 102. The power source for the bit removal device 906, may be any of the power sources discussed elsewhere in this disclosure, for example, an electric or hydraulic power source which may be included with the actuator 916 or may be external to the bit removal device 906 and connected via a connector 118.

Figure 11:
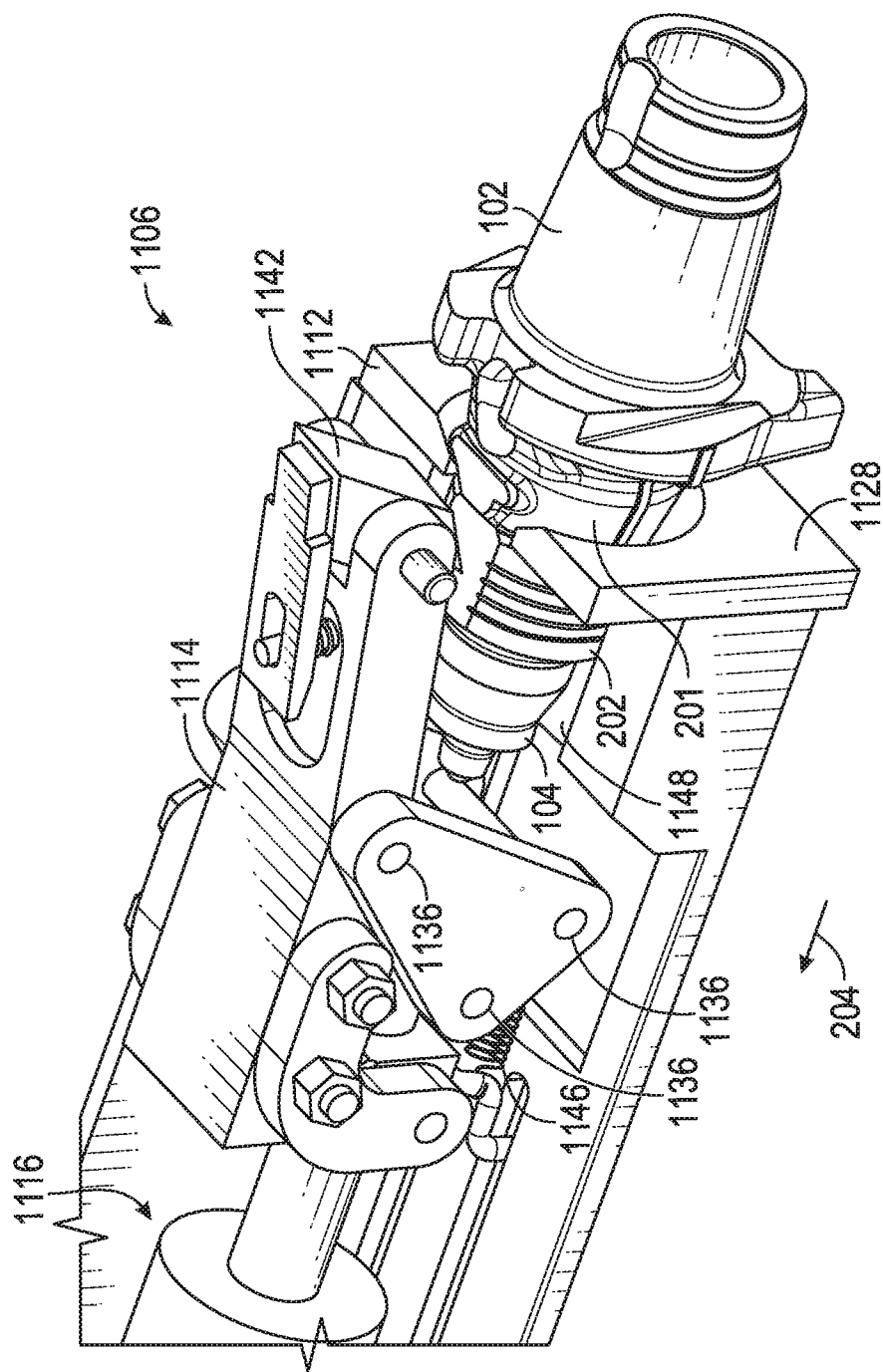
FIG. 11 is a perspective view of a bit removal device and a bit before the hit removal device has engaged the bit, in accordance with at least one example of the present disclosure.

FIG. 11 is a perspective view of an exemplary bit removal device 1106 and a bit 104 before the bit removal device 1106 has engaged the bit 104. The bit removal device 1106 includes a support 1112, an extractor 1114, and an actuator

1116. The extractor 1114 includes a lever 1142 that engages the bit 104 and adjusts as the actuator 1116 moves the extractor 1114 relative to the support 1112 in the movement direction 204, such that the lever 1142 moves radially inward (relative to an axis of the bit 104) to engage the back of the collar or washer 202 further. In at least one example, the lever 1142 is a tilting lever that tilts as the extractor 1114 moves in the movement direction. In some examples, the lever 1142 includes a lever bias 1144 to bias the angle of the lever 1142 until the lever 1142 engages the collar or washer 202, and the force overcomes the lever bias 1144, adjusting the angle of the lever 1142 to allow the lever 1142 to engage the collar or washer 202 further. In at least one example, the lever bias 1142 is a spring. In some examples, the lever 1142 engages the collar or washer 202 in a first position and moves to a second position as the bit 104 is removed from the bit holder 102, with the second position being deeper or further behind the collar or washer 202 than the first position. In some examples, the extractor 1114 includes an extractor bias 1146 to bias at least a portion of the extractor 1114 toward deeper engagement with the bit 104, for example, toward the longitudinal axis of the bit 104. In some examples, the extractor 1114 further includes one or more hinge points 636 to allow the extractor 1114 to tilt and adjust to further engage the bit 104.

The support 112 may include an arcuate bracket 1128 that engages the neck portion 201 of the bit holder 102 to support the extractor 1114 and maintain the position and orientation of the bit removal device 1106 as the extractor 1114 removes the bit 104 from the bit holder 102. In some examples, the support 112 may include a seat 1148 that guides the collar or washer 202 during removal of the bit 104. In at least one example, the seat 1148 helps maintain the orientation of the bit 104 to ensure extraction in the movement direction 204 will move the bit 104 along its longitudinal axis. In some examples, the seat 1148 allows for smooth sliding of the bit 104 along the seat 1148. For example, the seat 1148 may include a coating or otherwise be made of a material that is slippery, slick, or otherwise has a low coefficient of friction. In at least one example, the support 1112 comprises hardened steel. The power source for the bit removal device 1106, may be any of the power sources discussed elsewhere in this disclosure, for example, an electric or hydraulic power source which may be included with the actuator 1116 or may be external to the bit removal device 1106 and connected via a connector 118.

Figure 12:
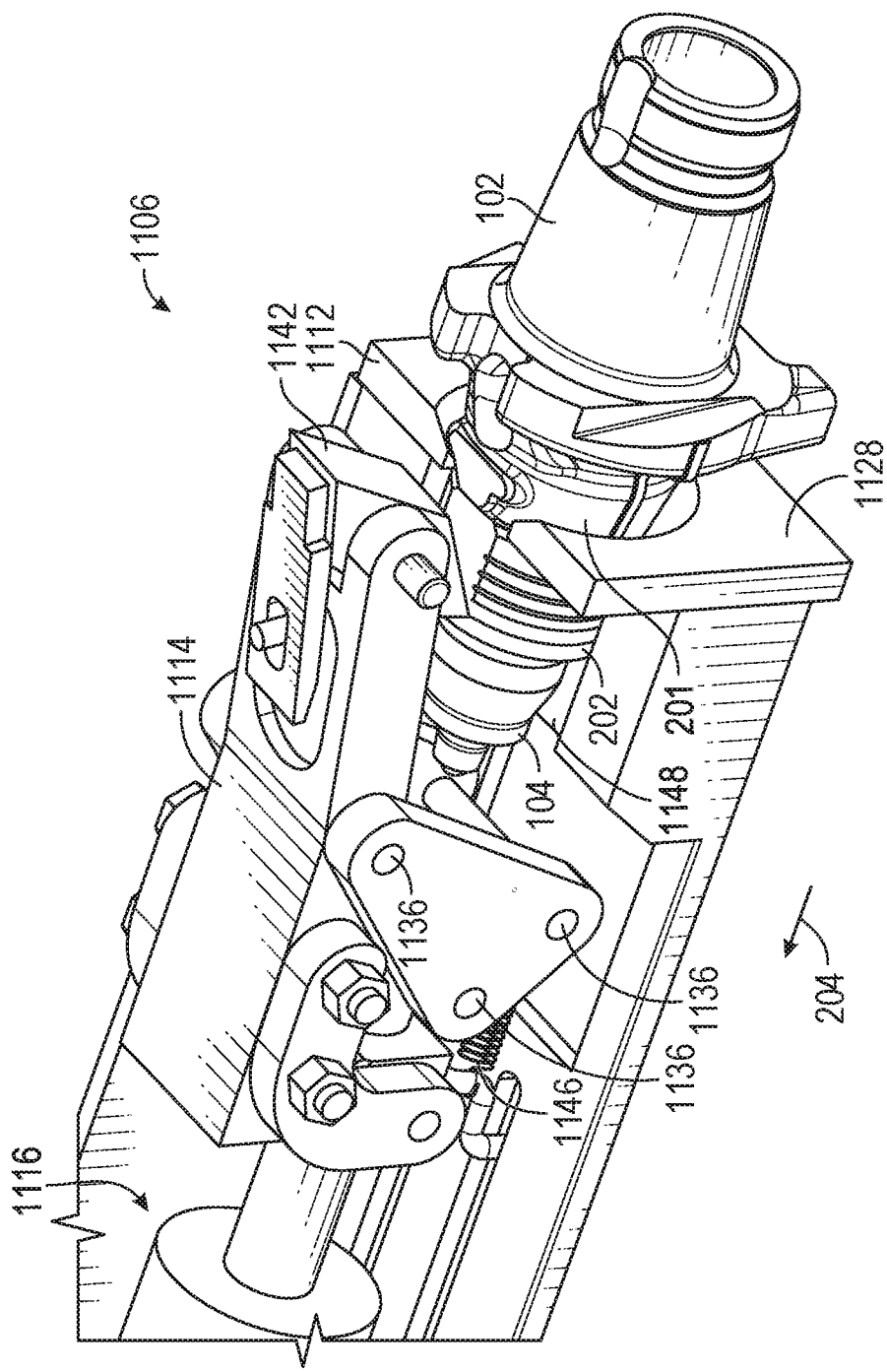
FIG. 12 is a perspective view of the bit removal device and the bit of FIG. 11 with the bit removal device engaging the bit, in accordance with at least one example of the present disclosure.
Figure 13:
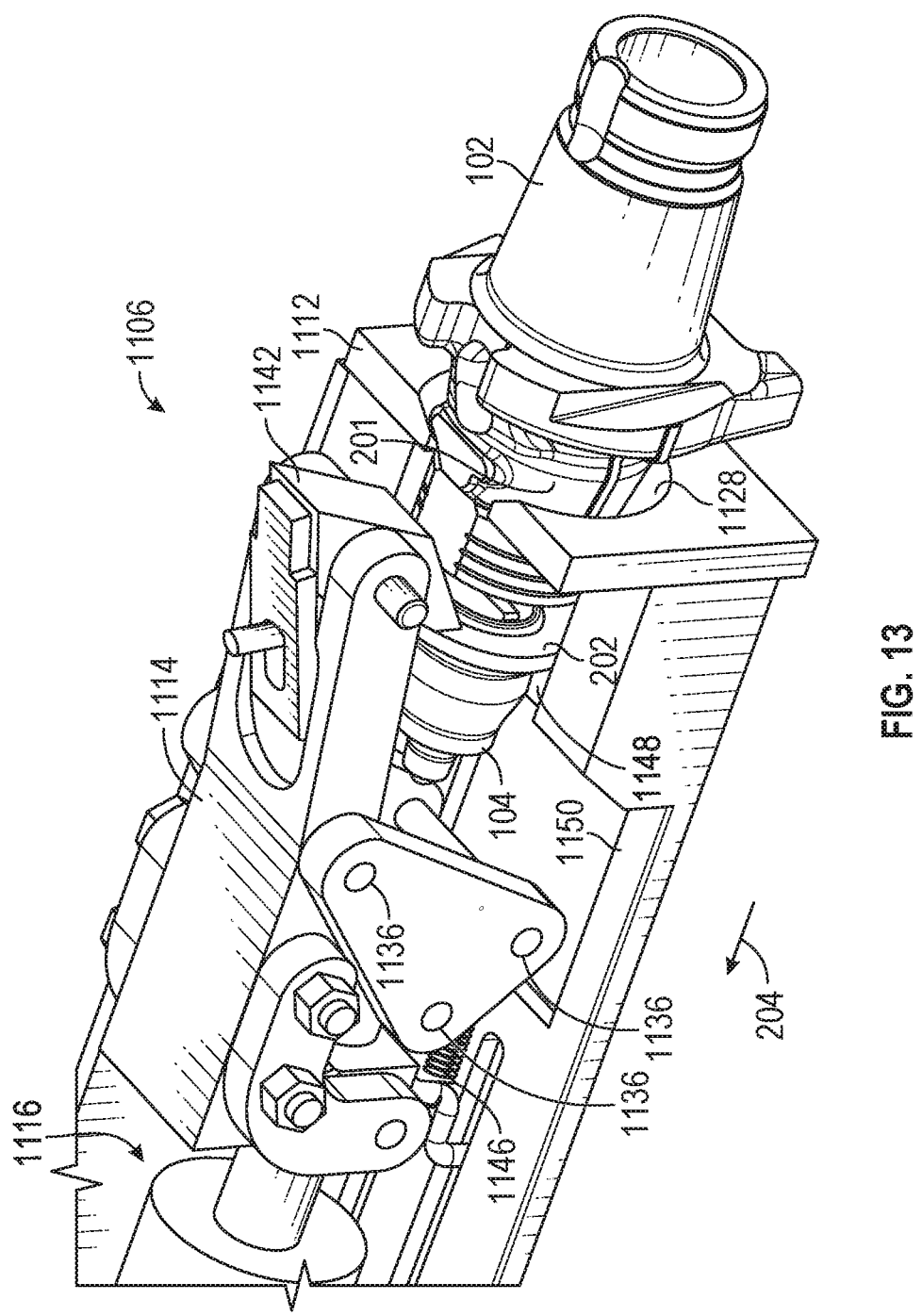
FIG. 13 is a perspective view of the bit removal device and the bit of FIGS. 11 and 12 as the bit removal device is removing the bit.

FIG. 12 is a perspective view of the bit removal device 1106 and the bit 104 of FIG. 11 with the bit removal device 1106 engaging the bit 104 in a first position. In the first position, the force of the collar or washer 202 against the lever 1142 (due to movement of the extractor 1114 in the movement direction 204) partially compresses the lever bias 1144 and tilts the lever 1142. As the actuator 1116 continues moving the extractor 1114 in the movement direction 204, the lever 1142 automatically moves into a second position, for example as shown in FIG. 13. In this second position, a greater portion of the lever 1142 is in contact with the bit 104 (specifically, the collar or washer 202) than in the first position. As the actuator 1116 continues moving the extractor 1114 in the movement direction 204, the force of the collar or washer 202 against the lever 1142 causes the lever bias 1144 to compress and the lever 1142 to engage the bit 104 deeper to facilitate a stronger hold on the bit 104 as it is removed. In at least one example, the extractor bias 1146 pulls at least a portion of the extractor 1114 downward to facilitate the deeper engagement by the lever 1142. In at least one example, the support 1112 defines an opening 1150, such that when the extractor 1114 extracts the bit 104 from the bit holder 102, the bit 104 falls freely through the opening 1150, and the bit removal device 1106 may be used on a subsequent bit 104.

The disclosed examples of FIGS. 1-13 are configured to approach the bit from a front side of the bit holder without requiring any part of the bit removal device to extend to or engage a back side of the bit holder to remove the bit. It should be noted that while certain features are described with regard to certain figures, many of the features from the different figures can be combined in a single embodiment, and many of the descriptions apply to similar elements throughout the figures. In some examples, one or more portions of the bit removal device may comprise plastic or metal. In some examples, instead of the extractor engaging the bit from behind the washer or collar, the extractor may engage a groove on the bit, for example a puller groove, which may be positioned anywhere on the bit. In some examples, one or more parts of the extractor (e.g. an arcuate bracket) may be resiliently mounted or spring loaded to account for wear of the washer, collar, groove, or other portion of the bit. In some examples, one or more parts of the support (e.g. an arcuate bracket) may be resiliently mounted or spring loaded to account for wear of the bit holder.

In at least one example, the bit removal device does not require that the bit holder have any special features for the bit removal device to remove the bit from the bit holder.

In at least one example the bit removal device may require the bit holder to have one or more surfaces corresponding to one or more surfaces of the bit removal device, such that the bit removal device may engage the bit holder. In at least one example, the bit holder has one or more flat surfaces corresponding to one or more flat surfaces of the bit removal device, such that the bit removal device can engage the bit holder. In at least one example, the bit removal device does not require that the bit have any special features for the bit removal device to remove the bit from the bit holder. In at least one example the bit removal device may require the bit to have one or more surfaces corresponding to one or more surfaces of the bit removal device, such that the bit removal device may engage the bit. In at least one example, the bit has one or more flat surfaces corresponding to one or more flat surfaces of the bit removal device, such that the bit removal device can engage the bit. While some examples show a particular orientation of a handle or power source, in some examples this orientation may differ (e.g., the handle shown FIG. 1 may extend perpendicular relative to the longitudinal axis of the illustrated example, or in any other direction or at any other angle as desired).

Figure 14:
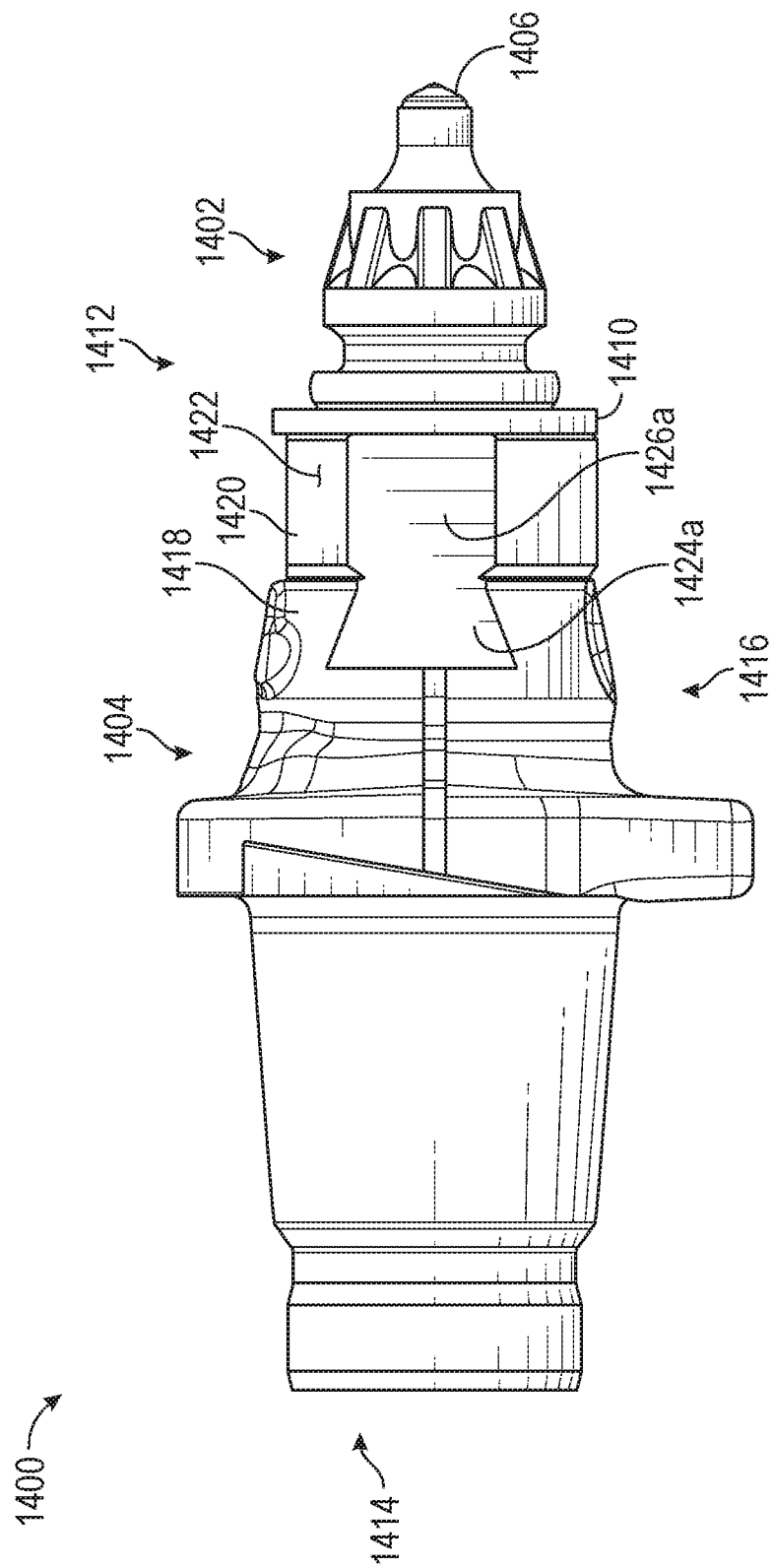
FIG. 14 is a side view of a bit holder assembly in a first condition, in accordance with at least one example of the present disclosure.
Figure 15:
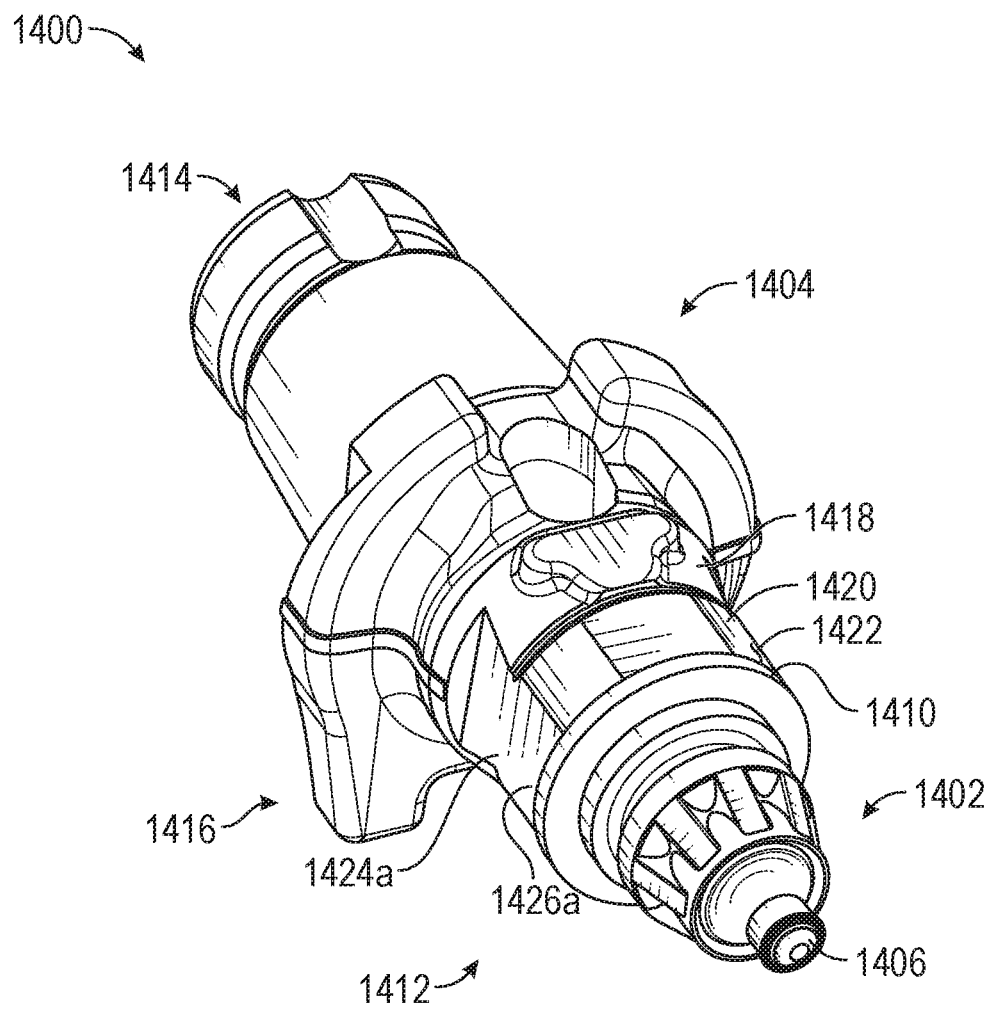
FIG. 15 is an isometric view of a bit holder assembly in a first condition, in accordance with at least one example of the present disclosure.
Figure 16:
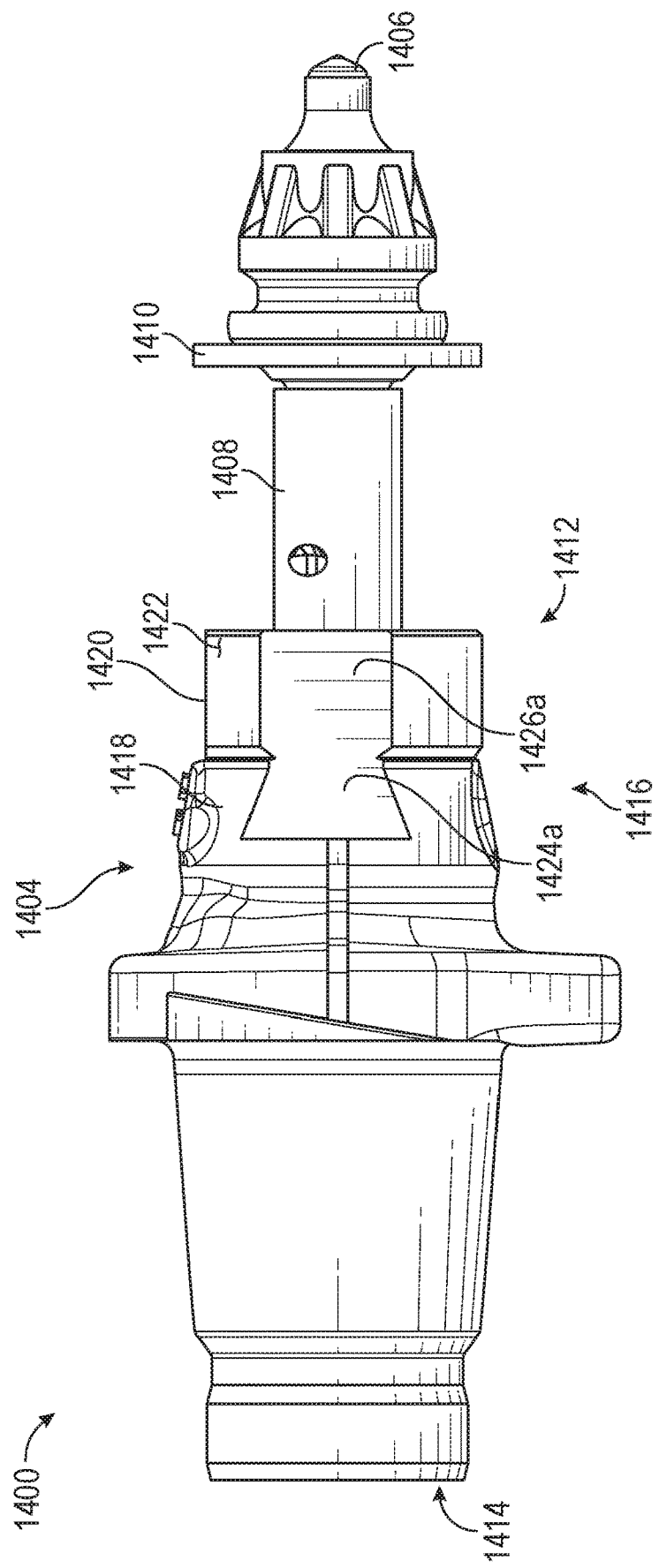
FIG. 16 is a side view of a bit holder assembly a second condition, in accordance with at least one example of the present disclosure.
Figure 17:
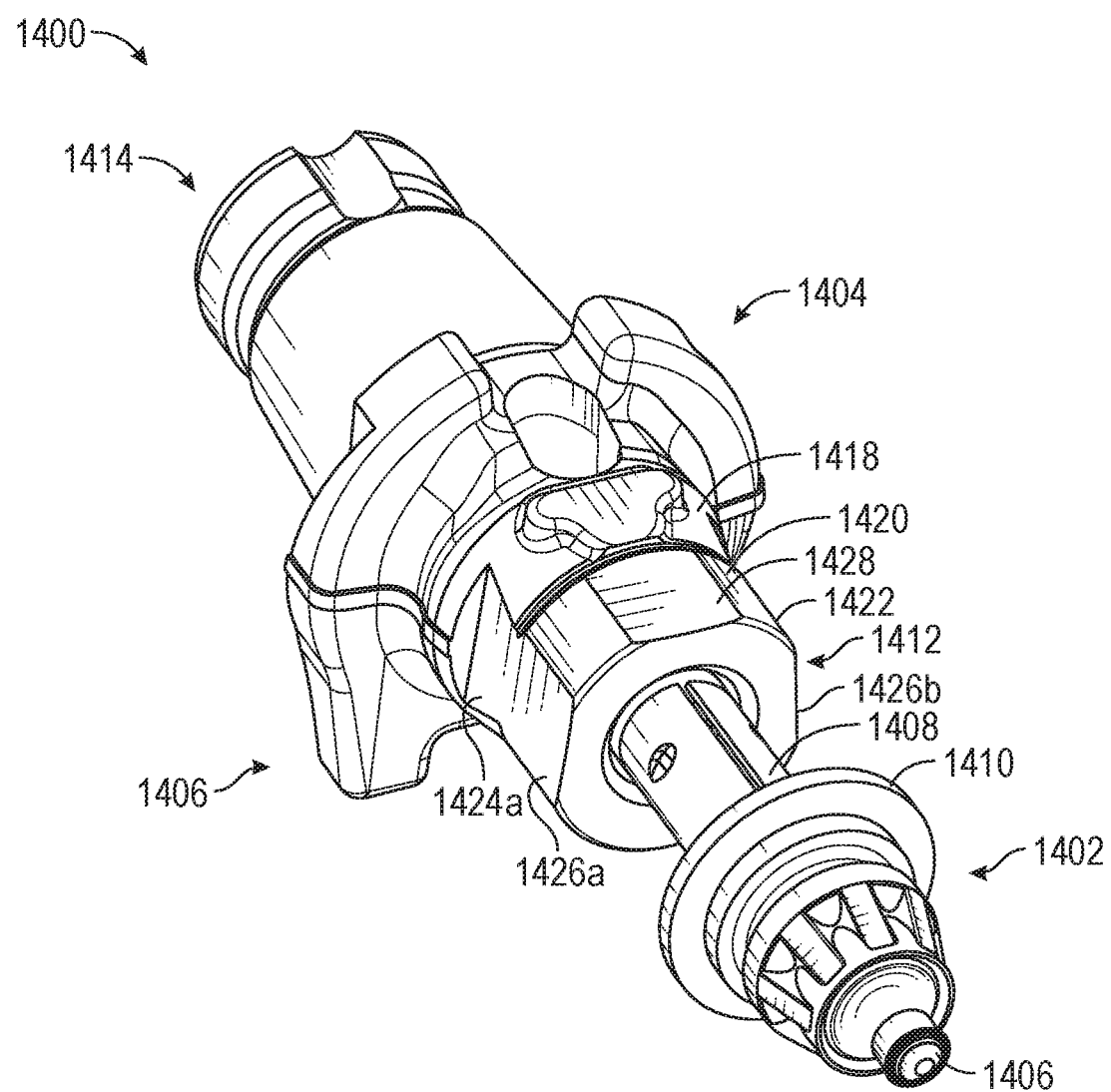
FIG. 17 is an isometric view of a bit holder assembly in a second condition, in accordance with at least one example of the present disclosure.

FIG. 14 is a side view of a bit holder assembly 1400 with a bit inserted in a bit holder, in accordance with at least one example of the present disclosure. FIG. 15 is an isometric view of the bit holder assembly 1400 with a bit inserted in a bit holder, in accordance with at least one example of the present disclosure. FIG. 16 is a side view of the bit holder assembly 1400 with a bit partially removed from a bit holder, in accordance with at least one example of the present disclosure. FIG. 17 is an isometric view of the bit holder assembly 1400 with a bit partially removed from a bit holder, in accordance with at least one example of the present disclosure. FIGS. 14-17 are discussed below concurrently.

The bit holder assembly 1400 can include a collar and body having flat portions at least partially defining an engagement surface for a bit removal tool. The flat surfaces can help enable securing of the removal tool to the bit holder to help reduce time spent removing each bit from its bit holder. Any of the previously discussed bit holders can be modified to include such flat surfaces or notches.

The bit holder assembly 1400 can include a bit 1402 and a bit holder 1404. The bit 1402 can include a bit tip 1406, a bit shaft 1408, and a bit washer 1410. The bit holder 1404 can include a front side 1412, a back side 1414, a body 1416 (including a neck portion 1418), and a collar 1420. The collar 1420 can include a collar surface 1422 (or radially outer collar surface) including a first collar flat 1426*a* and a second collar flat 1426*b* (collectively referred to as collar flats 1426 or notches 1426). The collar 1420 can also include a support flat 1428. The neck 1418 can include a first body flat 1424*a* and a second body flat 1424*b* (collectively referred to as body flats 1424). Also shown in FIGS. 14-17 are orientation indicators Front, Back, Top, and Bottom.

The bit 1402 can be a bit or tooth comprised of rigid materials such as steel, titanium, tungsten carbine, alloys thereof, and the like. In some examples, the bit 1402 can be configured for insertion into the bit holder 1404 for operation on a rotor (such as rotor 101 of FIG. 1), where the rotor can be part of a cold planer, a rotary mixer, a paving machine, or another rotary machine. The bit tip 1406 of the bit 1402 can be coupled to a front portion of the bit shaft 1408, where the bit tip 1406 is separated from the shaft 1408 by the hit washer 1410. In some examples, the bit washer 1410 can have a diameter that is larger than a diameter of the bit and larger than a diameter of the shaft to limit rearward translation of the bit into the bit holder.

The bit holder 1404 can be a rigid body mountable to a rotor or other rotating device and can be comprised of rigid materials such as steel, titanium, tungsten carbine, alloys thereof, and the like. The body 1416 of the bit holder 1404 can extend substantially from front to back and can include a bore extending partially therethrough. The neck portion 1418 of the body can be a reduced diameter portion of the body 1416 toward the front side 1412 of the body 1416. The neck portion 1418 can be connected to the collar 1420, and the collar 1420 can terminate at the front side 1412 of the bit holder 1404. The bore of the bit holder 1404 can extend from the front side 1412 of the bit holder 1404 at the collar 1420 and into the neck portion 1418. In some examples, the bore can extend further back into the body 1416, such that the bore of the bit holder 1404 can be configured to receive the bit 1402 therein.

The collar surface 1422 of the collar 1420 can be a substantially outer or radially outer surface of the collar 1420. In some examples, the collar 1420 can have a substantially hollow cylindrical shape. In other examples, the collar 1420 can have a geometric shape substantially of a hollow cylinder with one or more flat portions partially forming the collar surface 1422. For example, the collar surface 1422 can include the first collar flat 1426*a* and the second collar flat 1426*h*, which can be on substantially opposing sides of the collar 1420. Though two of the collar flats 1426 are discussed and shown, more collar flats, such as 3, 4, 5, 6, 7, 8, 9, 10, and the like can be used. In some examples, the collar 1420 can include a support flat 1428. In some examples, the collar flats 1426 can extend over an entire length of the collar. For example, the first collar flat 1426*a* can extend from a front end of the collar 1420 through a back end of the collar 1420 and the second first collar flat 1426*b* can extend from a front end of the collar 1420 through a back end of the collar 1420. The collar flats 1426 and the support flat 1428 can together be configured to receive and retain a removal tool, such as the bit removal device 106 of FIG. 2.

In some examples, the body 1416 can include one or more surfaces complementary to the flat surface of the collar 1420. For example, the neck 1418 of the body 1416 can include the first body flat 1424*a* and the second body flat 1424*b*. In some examples, the first body flat 1424*a* can be substantially coplanar with the first collar flat 1426*a* and the second body flat 1424*b* can be substantially coplanar with the second collar flat 1426*b*.

In operation of some examples, the bit 1402 can be inserted for use into the bit holder 1404, as shown in FIGS. 14 and 15. When the bit 1402 is secured within the bit holder 1404, the rotor of the machine or equipment (such as a cold planer) can be operated where the bit 1402 can be used to mill or remove at least a part of a surface (such as pavement, concrete, or asphalt). During use, the bits of the planer, such as bit 1402, can wear down from contact with the surface that is milled. Eventually the bit 1402 must be replaced. During replacement, a bit removal device, such as the bit removal device 106 of FIG. 2, can be used to remove the bit 1402 from the bit holder 1404.

For example, the support 112 of the bit removal device 106 can engage the body 1416 of the bit holder, as described with respect to FIGS. 2-5 above. The extractor 114 can simultaneously, or prior to, or after, be positioned on the body 1416 and/or the collar 1420. More specifically, a distal portion of the extractor 114 can include an opening configured to engage the collar 1420. In some examples, the distal portion of the extractor can include one or more flat surfaces, in some examples, similar to a shape of an obliquely angled crescent wrench. A first side of the extractor can be positioned to engage the first body flat 1424*a* and/or the first collar flat 1426*a* and a second side of the extractor can be positioned to engage the second body flat 1424*b* and/or the second collar flat 1426*h*. The collar flats 1426 and the body flats 1424 can thereby help to quickly and properly position the extractor 114 on the bit holder 1404 and can also aid in easy removal of the extractor 114 from the bit holder 1404.

Also, as discussed below in further detail, because the collar flats 1426 and the body flats 1424 can have a reduced thickness relative to the collar 1420 and the body 1416, respectively, the collar flats 1426 and the body flats 1424 can help allow the extractor to engage a back side of the washer 1410 of the bit so that the extractor 114 can apply a force on a back side of the washer 1410 to translate the bit washer 1410 and therefore the bit 1402 from back to front. The back to forward translation of the bit 1402 with respect to the bit holder 1404 can allow the bit shaft 1408 to be removed from the bit bore of the bit holder 1404, as shown in FIGS. 16 and 17, so that the bit 1402 can be entirely removed from the bit holder 1404.

In operation of some examples, cyclical contact between the bit washer 1410 and the collar 1420 can cause the collar 1420 to become worn down entirely through the length of the collar 1420 over time. The inclusion of body flats 1424 allows for access to the back side of the bit washer 1410 with the extractor 114 even when the collar 1420 is worn down. These features, such as the flat portions of the collar 1420 and the body 1416, can thereby help to save time and cost during replacement of the bits of a rotor.

Though the body flats 1424 and the collar flats 1426 can be configured to receive the extractor 114 for removal of the bit 1402, as discussed above and below, the body fiats 1424 and the collar flats 1426 can allow for general access to a back side of the bit collar 1410. For example, a chisel, punch, or various other hand tools can be used to engage a back side of the bit collar 1410 via the body flats 1424 and the collar flats 1426. In some examples, the body flats 1424 and the collar flats 1426 can provide access to the back side of the bit collar 1410 for a pneumatic or electric chisel or punch, which can be used to remove the bit 1402 from the bit holder 1404. Further, as few as one of the body flats 1424 and the collar flats 1426 can be used for access to the back side of the bit collar 1410 in some examples.

In other examples, the body flats 1424 and the collar flats 1426 can be used for other purposes. For example, the body flats 1424 and/or the collar flats 1426 can be used to help limit rotation of the bit collar 1410 or other components.

Figure 18:
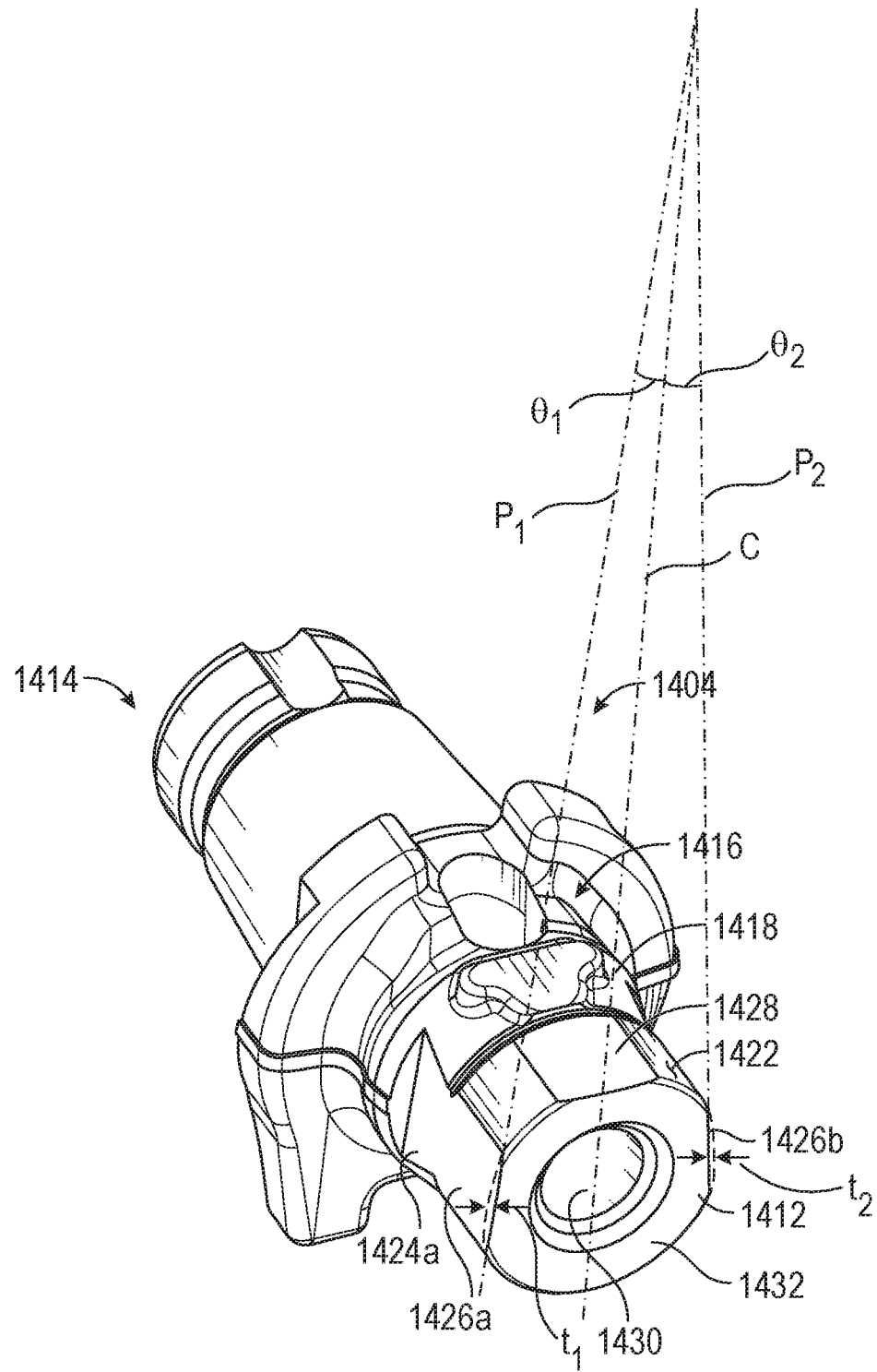
FIG. 18 is an isometric view of a bit holder, in accordance with at least one example of the present disclosure.
Figure 19:
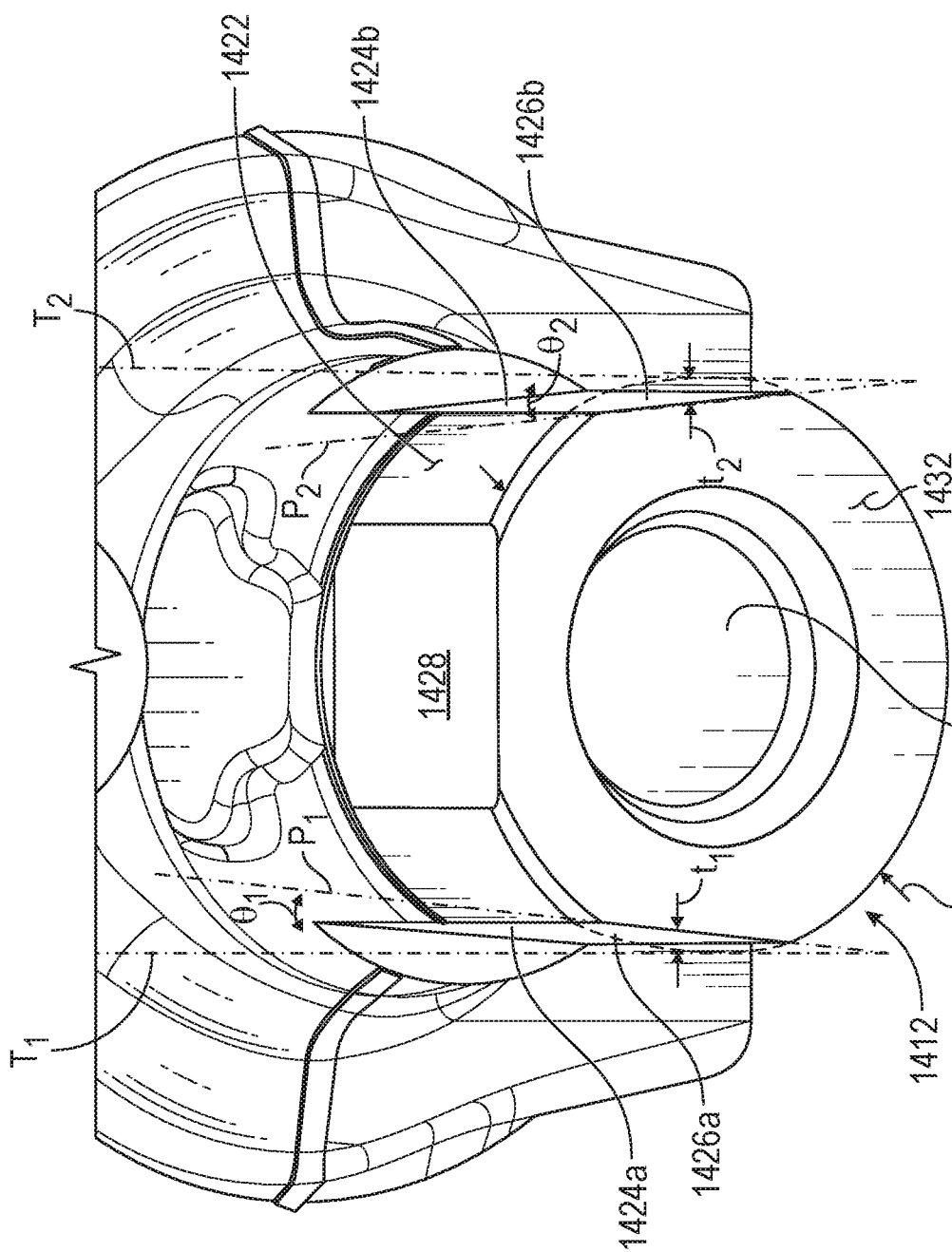
FIG. 19 is an isometric view of a bit holder, in accordance with at least one example of the present disclosure.

FIG. 18 is an isometric view of the bit holder 1404, in accordance with at least one example of the present disclosure. FIG. 19 is an isometric view of the bit holder 1404, in accordance with at least one example of the present disclosure. FIGS. 18 and 19 are discussed below concurrently.

The bit holder 1404 can include the front side 1412, the back side 1414, a body 1416 (including a neck portion 1418), and the collar 1420. The collar 1420 can include the collar surface 1422 including the first collar flat 1426a and the second collar flat 1426b (collectively referred to as collar flats 1426). The collar 1420 can also include the support flat 1428. The neck 1418 can include the first body flat 1424a and the second body flat 1424h (collectively referred to as body flats 1424). The collar 1420 can also include a bit bore 1430 and a front collar surface 1432. Also shown in FIG. 18 are orientation indicators Front and Back. Also shown in FIG. 19 are a first collar tangent T1, a second collar tangent T2, a first collar plane P1, a second collar plane P2, a first angle Θ1, a second angle Θ2, a collar diameter D, a first thickness t2, and a second thickness t2.

The bit holder 1404 of FIGS. 18 and 19 can be similar to the bit holder 1404 shown in FIGS. 14-17; however, FIGS. 18 and 19 show additional details of the bit holder 1404. For example, FIG. 18 shows the bit bore 1430 of the body 1416, which can extend from the front side of the collar 1420 into the body 1416. FIG. 18 also shows the front collar surface 1432, which can be a front-most surface of the collar 1420. In some examples, the front collar surface 1432 can be configured to engage the bit washer 1410 (shown in FIGS. 14-17).

As discussed above, the first flat collar surface 1426a can form the portion of the outer surface 1422 of the collar 1420 and the second flat collar surface 1426b can form the portion of the outer surface 1422 of the collar 1420 on a substantially opposite side of the collar 1420 from the first flat collar surface 1426a. FIG. 19 shows further detail of the bit holder 1404 with respect to these features. For example, FIG. 19 shows tangents T1 and T2 of collar 1420. In some examples, collar 1420 can have a substantially round outer profile where tangents T1 and T2 can be tangents of the outer diameter D of the collar 1420. In some examples, tangents T1 and T2 can be generally placed on opposite sides of the collar 1420. And, in some examples, tangents T1 and T2 can be substantially parallel to each other, but in other examples tangents T1 and T2 may not be parallel.

FIG. 19 also shows the planes P1 and P2, where the plane P1 can be defined by the flat or planar surface 1426a of the collar 1420 and the body flat 1424a of the body 1415, and plane P2 can be defined by the flat or planar surface 1424h of the body 1416 and the flat surface 1426a of the collar 1420. That is, plane P1 can be a line partially defining a plane along which the first flat body surface 1424a and the first flat collar surface 1426a extend and plane P2 can be a line partially defining a plane along which the second flat body surface 1424h and the second flat collar surface 1426b extend.

In some examples, the planes P1 and P2 can be at an angle relative to tangents T1 and T2, respectively. The plane P1 can be at the first angle Θ1 with respect to the tangent T and the plane P2 can be at the second angle Θ2 with respect to the tangent T2, as shown in FIG. 19. These angles can also be represented where the first angle Θ1 is formed by the Plane P1 and the centerline C, and the second angle Θ2 is formed by the plane P2 and the centerline C, as shown in FIG. 18.

In some examples, the first angle Θ1 can be the same as the second angle Θ2; however, in other examples, the first angle Θ1 can differ from the second angle Θ2. In some examples, either or both of the first angle Θ1 and the second angle Θ2 can be at angles such as 0.1 degrees, 1, 2, 3, 4, 5, 6, 7, 8, 9, 10, 15 degrees and the like. In some examples, either or both of the first angle Θ1 and the second angle Θ2 can be at angles between about 0.1 degrees and about 10 degrees. In some examples, either or both of the first angle Θ1 and the second angle Θ2 can be at angles between about 2 degrees and about 6 degrees. In some examples, either or both of the first angle Θ1 and the second angle Θ2 can be at angles between about 3 degrees and about 5 degrees.

In some examples, the material removed to create the first flat 1426a and the second flat 1426h of the collar 1420 can be at the first thickness t1 and a second thickness t2, respectively, to allow for the extractor 114 to engage the back side of the hit washer 1410 while minimizing reduction in a surface area of the collar 1420 and the body 1416. Such a reduction in surface area can increase operation stresses within the collar 1420 and the body 1416. In some examples, the first flat 1426a and the second flat 1426b of the collar 1420 can be positioned on the collar and can be angled at the first angle Θ1 and the second angle Θ2, respectively, to decrease surface area by about 10 percent. In other examples, the total surface area can be decreased more or less, such as 5, 6, 7, 8, 9, 11, 12, 13, 14, 15, 20 percent, and the like.

In some examples, to accomplish this reduction, either or both of the removal thicknesses t1 and t2 from the outer diameter D of the collar 1420 (shown in phantom in FIGS. 18 and 19) can be between 0.1 millimeters (mm) and 4 mm. In some examples, the removal thicknesses t1 can be the largest distance between the tangent T1 and the plane P1 and the removal thicknesses t2 can be the largest distance between the tangent T2 and the plane P2. In other words, the first flat collar surface 1426a can extend radially inward from an outer radius of the collar (the collar surface 1422) between 0.1 and 4.0 millimeters and the second flat collar surface 1426b can extend radially inward from an outer radius of the collar (the collar surface 1422) between 0.1 and 4.0 millimeters. In some examples, either or both of the removal thicknesses t1 and t2 can be about 1 mm to about 2 mm.

Figure 20:
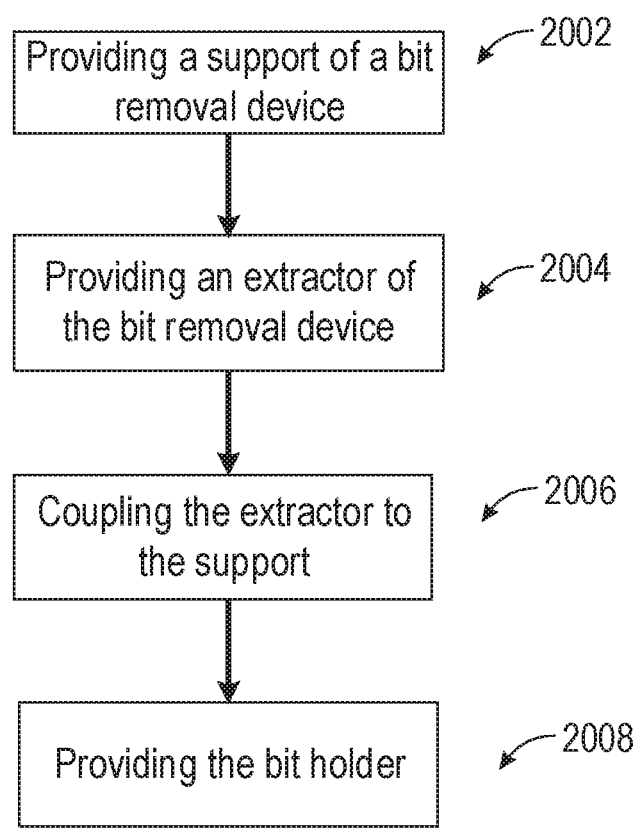
FIG. 20 is a schematic view of a method, in accordance with at least one example of the present disclosure.

FIG. 20 is a schematic view of a method 2000, in accordance with at least one example of the present disclosure. Method 2000 can be a method or process for removing and/or replacing a bit of a bit holder using a bit removal device, such as the bit removal device 106 of FIG. 2. FIG. 20 shows a flow chart of using the devices and systems described above, in accordance with at least one example of this disclosure. The steps or operations of the method of FIG. 20 are illustrated in a particular order for convenience and clarity. Many of the discussed operations can be performed in a different sequence or in parallel, and some operations may be excluded, without materially impacting other operations. The method of FIG. 20, as discussed, includes operations that may be performed by multiple different actors, devices, and/or systems. It is understood that subsets of the operations discussed in the method of FIG. 20 that are attributable to a single actor, device, or system could be considered a separate standalone process or method.

In some examples, method 2000 can be a method of removing a bit from a bit holder. Method 2000 can begin at step 2002, a support of a bit removal device can be provided, where the support is configured to engage a body of a bit holder. At step 2004 an extractor of the bit removal tool can be provided, where the extractor can be configured to engage a first flat and a second flat of a collar of the bit holder. For example, the extractor 114 of the bit removal tool 106 can be provided, where the extractor 114 can be configured to engage the first flat 1426a and the second flat 1426b of the collar 1420 of the bit holder 1404.

At step 2006 the support can be coupled to the extractor with an actuator configured to move the extractor relative to the support to extract the bit from the bit holder. For example, the support 112 can be coupled to the extractor 114 with an actuator 116, where the actuator 116 can be configured to move the extractor 114 relative to the support 112 to extract the bit 1402 from the bit holder 1404.

In another example, a bit holder can be provided that includes a first body flat that is coplanar with the first flat of the collar and that includes a second body flat that is coplanar with the second flat of the collar. For example, the bit holder 1404 can be provided to include the first body flat 1426a that is coplanar with the first collar flat 1424a. And, the bit holder 1404 can be provided to include the second body flat 1426b that is coplanar with the second collar flat 1424h.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific examples. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific examples. However, the benefits, advantages, solutions to problems, and any feature(s) that may cause any benefit, advantage, or solution to occur or become more pronounced are not to be construed as a critical, required, or essential feature of any or all the claims. Moreover, the particular examples disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular examples disclosed above may be altered or modified and all such variations are considered within the scope of the disclosed subject matter. Accordingly, the protection sought herein is as set forth in the claims below.

INDUSTRIAL APPLICABILITY

The disclosed bit removal devices may be applicable to any cold planer, rotary mixer, or other machinery involving a rotary of bits which require removal. The disclosed bit removal devices may provide for improved serviceability, be used universally with different bit holders, allow for approach from the front of the bit holder, reduce noise pollution, and allow for better visibility for the technician.

Features of the disclosed bit removal devices (for example, at least the bracing element and the extraction element) allow for removal of the bit completely from the front side of the bit holder, instead of requiring the technician or the bit removal device to reach around the back side of the bit holder to push the bit out. This can allow for better visibility by the technician as during the bit removal process. Further, since the disclosed bit removal devices do not require that the bit holder have specific features to allow for removal of the bit, the disclosed bit removal devices may be used universally for a variety of different bit holders, making the disclosed hit removal devices more versatile than many conventional attempts.

However, in some examples, features of the disclosed bit holder (for example the flat faces of the collar and/or the flat faces of the neck of the body of the bit holder) can allow for relatively fast securing of the hit removal tool onto the bit holder. This interface between the bit holder and the bit removal tool (such as the extractor) can help to save time during bit replacement.

Since the technician works in a constrained area within the rotor housing while removing the bits, the louder the bit removal device the more noise pollution the technician will be exposed to for the duration of the bit removal process. In some examples the disclosed bit removal devices may use an electric or hydraulic power source, which can reduce noise pollution (for example, relative to pneumatic devices).

What is claimed is:
1. A bit holder comprising:
 a body mountable to a rotor of a piece of equipment, the body defining a body bore configured to receive a bit therein, the body including a first body flat; and
 a collar coupled to the body, the collar defining a collar bore substantially coaxial with the body bore and configured to receive the bit therein, the collar comprising:
 a first flat collar surface forming a portion of a radially outer surface of the collar, the first flat collar surface adjacent to and coplanar with the first body flat; and
 a second flat collar surface forming a portion of the radially outer surface of the collar on an opposite side of the collar from the first flat collar surface.
2. The bit holder of claim 1, wherein the collar has a geometric shape substantially of a hollow cylinder with two flat portions on the radially outer surface of the hollow cylinder, wherein the two flat portions include the first and the second flat collar surfaces.

3. The bit holder of claim 1, wherein the first flat collar surface is angled with respect to a first tangent of the collar.

4. The bit holder of claim 3, wherein the first flat collar surface is angled at an angle between 0.1 degrees and 10 degrees.

5. The bit holder of claim 3, wherein the second flat collar surface is not parallel to the first collar surface.

6. The bit holder of claim 1, wherein the first flat collar surface and the second flat collar surface extend along an entirety of a length of the collar.

7. The bit holder of claim 1, wherein the body includes a second body flat, the second body flat coplanar with the second collar flat.

8. The bit holder of claim 7, wherein the collar is coupled to a back side of the body, and wherein the first body flat extends from the back side of the body proximally into the body.

9. The bit holder of claim 1, wherein the first flat collar surface extends radially inward from an outer radius of the collar between 0.1 and 4.0 millimeters.

10. A bit removal system comprising:
a bit holder comprising:
a body mountable to a rotor of a piece of equipment, the body configured to receive a bit therein, the body including a first body flat;
a collar coupled to the body, the collar configured to receive a bit therein, the collar comprising:
a first notch forming a first planar surface located on a periphery of the collar, the first body flat coplanar with the first notch; and
a second notch forming a second planar located on the periphery of the collar on an opposite side of the collar from the first notch; and
a bit removal device insertable onto the collar over the first notch and the second notch, the bit removal device supportable by the body and operable to engage the bit to remove the bit from the bit holder.

11. The bit holder of claim 10, wherein the bit removal device includes an extractor insertable onto the first and second notches of the collar to engage the bit from a distal side of the bit holder to extract the bit from the bit holder.

12. The bit holder of claim 11, wherein the bit removal device includes a support coupled to the extractor and configured to engage the bit holder to support the extractor as it extracts the bit from the bit holder.

13. The bit holder of claim 12, wherein the bit removal device includes an actuator configured to move the extractor relative to the support to extract the bit from the bit holder.

14. The bit holder of claim 10, wherein the collar has a geometric shape substantially of a hollow cylinder with two flat portions on a radially outer surface of the hollow cylinder, wherein the two flat portions are comprised of the first and second notches.

15. The bit holder of claim 10, wherein the first notch is angled with respect to a first tangent of the collar, and wherein the second notch is angled with respect to a second tangent of the collar that is parallel to the first tangent.

16. The bit holder of claim 15, wherein the first notch is angled at an angle between 2 degrees and 6 degrees.

17. The bit holder of claim 10, wherein the first notch and the second notch extend along an entirety of a length of the collar.

18. The bit holder of claim 10, wherein the collar is coupled to a back side of the body, and wherein the body includes a second body flat adjacent to the second notch, the second body flat coplanar with the second notch, and wherein the first body flat and the second body flat extend from the back side of the body proximally into the body.

* * * * *